US008792673B2

(12) United States Patent
Levien et al.

(10) Patent No.: US 8,792,673 B2
(45) Date of Patent: *Jul. 29, 2014

(54) MODIFYING RESTRICTED IMAGES

(75) Inventors: Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/136,662

(22) Filed: Aug. 5, 2011

(65) Prior Publication Data
US 2012/0093355 A1   Apr. 19, 2012

Related U.S. Application Data

(63) Continuation of application No. 12/928,448, filed on Dec. 9, 2010, now abandoned, and a continuation of application No. 11/195,358, filed on Aug. 2, 2005, now Pat. No. 7,860,342, and a continuation of application No. 11/195,346, filed on Aug. 2, 2005, now abandoned, and a continuation of application No. 11/173,990, filed on Jul. 1, 2005, and a continuation of application No. 11/174,432, filed on Jul. 1, 2005.

(51) Int. Cl.
*G06K 9/00* (2006.01)

(52) U.S. Cl.
USPC .......................................... 382/100; 380/207

(58) Field of Classification Search
CPC ................ G06T 3/0056; G06T 5/00; G06T 2207/20012; G06T 2207/20221; G06K 9/00221; G06K 9/00362; G06K 9/00369; G11B 27/031; G11B 27/28; G06F 21/6254; H04N 5/23219
USPC ........... 382/100, 276, 284; 348/598; 380/205, 380/207, 210
See application file for complete search history.

(56) References Cited

U.S. PATENT DOCUMENTS

| 3,278,676 | A | 10/1966 | Becker ............................. 178/6 |
| 3,713,148 | A | 1/1973 | Cardullo et al. |
| 4,467,349 | A | 8/1984 | Maloomian |
| 4,872,056 | A | 10/1989 | Hicks et al. |
| 5,060,171 | A | 10/1991 | Steir et al. |
| 5,343,386 | A | 8/1994 | Barber |
| 5,345,313 | A | 9/1994 | Blank |

(Continued)

FOREIGN PATENT DOCUMENTS

| JP | 2005-005960 A | 1/2005 |
| KR | 10-2007-1012360 A | 10/2007 |
| WO | WO 2005/078597 A1 | 8/2005 |

OTHER PUBLICATIONS

Manovich, Lev; "Post-Media Aesthetics"; Google; bearing a date of 2005; pp. 1-18.

(Continued)

*Primary Examiner* — Andrew W Johns

(57) ABSTRACT

An apparatus, device, methods, computer program product, and system are described that determine a restricted image within a media asset, modify the restricted image to obtain a modified image that includes at least one shared image attribute of the restricted image, and produce a modified media asset that includes the modified image.

34 Claims, 16 Drawing Sheets

(56) References Cited

U.S. PATENT DOCUMENTS

| | | | |
|---|---|---|---|
| 5,469,536 A | 11/1995 | Blank | |
| 5,481,664 A | 1/1996 | Hiroya et al. | |
| 5,623,587 A | 4/1997 | Bulman | |
| 5,629,736 A | 5/1997 | Haskell et al. | |
| 5,629,980 A | 5/1997 | Stefik et al. | 380/4 |
| 5,640,560 A | 6/1997 | Smith | |
| 5,680,619 A | 10/1997 | Gudmundson et al. | |
| 5,708,709 A | 1/1998 | Rose | |
| 5,708,766 A | 1/1998 | Goto | |
| 5,712,964 A | 1/1998 | Kamada et al. | |
| 5,742,816 A | 4/1998 | Barr et al. | |
| 5,748,956 A | 5/1998 | Lafer et al. | |
| 5,819,086 A | 10/1998 | Kroenke | |
| 5,828,402 A | 10/1998 | Collings | |
| 5,859,662 A | 1/1999 | Cragun et al. | |
| 5,861,880 A | 1/1999 | Shimizu et al. | |
| 5,892,900 A | 4/1999 | Ginter et al. | |
| 5,898,430 A | 4/1999 | Matsuzawa et al. | |
| 5,903,317 A | 5/1999 | Sharir et al. | |
| 5,933,498 A | 8/1999 | Schneck et al. | 380/4 |
| 5,945,989 A | 8/1999 | Freishtat et al. | |
| 5,991,782 A | 11/1999 | Miyagawa et al. | |
| 6,018,744 A | 1/2000 | Mamiya et al. | |
| 6,047,128 A | 4/2000 | Zander | |
| 6,067,399 A | 5/2000 | Berger | |
| 6,135,646 A | 10/2000 | Kahn et al. | 395/200.47 |
| 6,181,336 B1 | 1/2001 | Chiu et al. | |
| 6,189,146 B1 | 2/2001 | Misra et al. | |
| 6,236,971 B1 | 5/2001 | Stefik et al. | 705/1 |
| 6,253,193 B1 | 6/2001 | Ginter et al. | |
| 6,297,853 B1 | 10/2001 | Sharir et al. | |
| 6,363,488 B1 | 3/2002 | Ginter et al. | |
| 6,385,592 B1 | 5/2002 | Angles et al. | |
| 6,388,682 B1 | 5/2002 | Kurtzberg et al. | |
| 6,389,402 B1 | 5/2002 | Ginter et al. | |
| 6,394,356 B1 | 5/2002 | Zagami | |
| 6,400,374 B2 | 6/2002 | Lanier | |
| 6,418,439 B1 | 7/2002 | Papierniak et al. | |
| 6,427,140 B1 | 7/2002 | Ginter et al. | |
| 6,493,744 B1 | 12/2002 | Emens et al. | |
| 6,505,169 B1 | 1/2003 | Bhagavath et al. | |
| 6,542,925 B2 | 4/2003 | Brown et al. | 709/208 |
| 6,567,569 B1 | 5/2003 | Claessens | |
| 6,574,793 B1 | 6/2003 | Ngo et al. | |
| 6,577,746 B1 * | 6/2003 | Evans et al. | 382/100 |
| 6,654,814 B1 | 11/2003 | Britton et al. | |
| 6,675,387 B1 | 1/2004 | Boucher et al. | |
| 6,704,930 B1 | 3/2004 | Eldering et al. | |
| 6,719,565 B1 | 4/2004 | Saita et al. | |
| 6,745,226 B1 | 6/2004 | Guedalia | |
| 6,775,381 B1 | 8/2004 | Nelson et al. | |
| 6,779,117 B1 | 8/2004 | Wells | |
| 6,801,642 B2 | 10/2004 | Gorday et al. | |
| 6,807,534 B1 | 10/2004 | Erickson | |
| 6,816,628 B1 | 11/2004 | Sarachik et al. | |
| 6,829,368 B2 | 12/2004 | Meyer et al. | |
| 6,829,780 B2 | 12/2004 | Kraft et al. | |
| 6,903,756 B1 | 6/2005 | Giannini | |
| 6,912,571 B1 | 6/2005 | Serena | |
| 6,937,730 B1 | 8/2005 | Buxton | |
| 6,959,099 B2 | 10/2005 | Gutta et al. | |
| 6,970,602 B1 | 11/2005 | Smith et al. | |
| 6,973,130 B1 | 12/2005 | Wee et al. | |
| 7,006,155 B1 | 2/2006 | Agarwala et al. | 348/592 |
| 7,092,568 B2 | 8/2006 | Eaton | |
| 7,106,887 B2 | 9/2006 | Kinjo | 382/118 |
| 7,109,993 B2 | 9/2006 | Peleg et al. | 345/473 |
| 7,120,250 B2 | 10/2006 | Candelore | |
| 7,162,690 B2 | 1/2007 | Gupta et al. | |
| 7,181,758 B1 | 2/2007 | Chan | |
| 7,212,650 B2 | 5/2007 | Sumi | |
| 7,216,351 B1 | 5/2007 | Maes | 719/328 |
| 7,251,048 B2 | 7/2007 | Cheatle et al. | |
| 7,284,040 B2 | 10/2007 | Kobayashi et al. | 709/219 |
| 7,313,810 B1 | 12/2007 | Bell et al. | |
| 7,333,957 B2 | 2/2008 | Levy et al. | |
| 7,334,017 B2 | 2/2008 | Hawkes et al. | |
| 7,334,249 B1 | 2/2008 | Byers | 725/35 |
| 7,346,585 B1 | 3/2008 | Alabraba et al. | |
| 7,391,432 B2 | 6/2008 | Terada | |
| 7,406,434 B1 | 7/2008 | Chang et al. | |
| 7,406,658 B2 | 7/2008 | Brassell et al. | |
| 7,456,871 B2 | 11/2008 | Iida et al. | |
| 7,571,385 B2 | 8/2009 | Miller et al. | |
| 7,668,242 B2 | 2/2010 | Sullivan et al. | |
| 7,668,345 B2 | 2/2010 | Kiyohara et al. | |
| 7,673,013 B2 | 3/2010 | Rudolph et al. | |
| 7,680,819 B1 | 3/2010 | Mellmer et al. | |
| 7,725,812 B1 | 5/2010 | Balkus et al. | |
| 7,752,548 B2 | 7/2010 | Mercer | |
| 7,769,416 B2 | 8/2010 | Wei et al. | 455/574 |
| 7,782,993 B2 | 8/2010 | Lesser et al. | 375/371 |
| 7,805,678 B1 | 9/2010 | Niles et al. | 715/716 |
| 7,847,815 B2 | 12/2010 | Patel et al. | 348/14.08 |
| 7,860,342 B2 * | 12/2010 | Levien et al. | 382/276 |
| 7,890,368 B2 | 2/2011 | Lambert et al. | 705/14.4 |
| 7,895,617 B2 | 2/2011 | Pedlow, Jr. | |
| 7,895,620 B2 | 2/2011 | Haberman et al. | 725/35 |
| 7,903,904 B1 | 3/2011 | Loeb et al. | 382/305 |
| 7,917,924 B2 | 3/2011 | Haberman et al. | |
| 8,006,186 B2 | 8/2011 | Kellock et al. | 715/728 |
| 8,031,060 B2 | 10/2011 | Hoffberg et al. | |
| 8,099,660 B1 | 1/2012 | O'Sullivan et al. | |
| 8,180,826 B2 | 5/2012 | Hua et al. | 709/203 |
| 8,345,918 B2 | 1/2013 | Fleisher | 382/103 |
| 8,375,302 B2 | 2/2013 | Oakley et al. | 715/723 |
| 2001/0016820 A1 | 8/2001 | Tanaka et al. | |
| 2001/0023436 A1 | 9/2001 | Srinivasan et al. | |
| 2001/0033661 A1 | 10/2001 | Prokoski | |
| 2001/0033671 A1 | 10/2001 | Kearey | |
| 2001/0033674 A1 | 10/2001 | Chen et al. | |
| 2001/0034740 A1 | 10/2001 | Kerne | |
| 2001/0034742 A1 | 10/2001 | Stinson | 707/501.1 |
| 2001/0041050 A1 | 11/2001 | Iwata et al. | |
| 2001/0044781 A1 | 11/2001 | Shutes | |
| 2002/0010757 A1 | 1/2002 | Granik et al. | |
| 2002/0033842 A1 | 3/2002 | Zetts | 345/719 |
| 2002/0073121 A1 | 6/2002 | Sano et al. | 707/517 |
| 2002/0077986 A1 | 6/2002 | Kobata et al. | 705/52 |
| 2002/0081003 A1 | 6/2002 | Sobol | |
| 2002/0109707 A1 | 8/2002 | Lao et al. | |
| 2002/0129273 A1 | 9/2002 | Noonan | 713/201 |
| 2002/0144262 A1 | 10/2002 | Plotnick et al. | |
| 2002/0146123 A1 | 10/2002 | Tian | |
| 2002/0146238 A1 | 10/2002 | Sugahara | |
| 2002/0162120 A1 | 10/2002 | Mitchell | 725/135 |
| 2002/0178077 A1 | 11/2002 | Katz et al. | |
| 2002/0184183 A1 | 12/2002 | Cherry et al. | 707/1 |
| 2002/0194595 A1 | 12/2002 | Miller et al. | |
| 2002/0198909 A1 | 12/2002 | Huynh et al. | |
| 2002/0199189 A1 | 12/2002 | Prijatel et al. | |
| 2003/0007700 A1 | 1/2003 | Gutta et al. | |
| 2003/0018966 A1 | 1/2003 | Cook et al. | 725/2 |
| 2003/0028432 A1 | 2/2003 | Troyansky et al. | |
| 2003/0028543 A1 | 2/2003 | Dusberger | |
| 2003/0028873 A1 | 2/2003 | Lemmons | |
| 2003/0033202 A1 | 2/2003 | Ogawa et al. | |
| 2003/0058939 A1 | 3/2003 | Lee et al. | |
| 2003/0070167 A1 | 4/2003 | Holtz et al. | 725/32 |
| 2003/0076321 A1 | 4/2003 | Clavadetscher | |
| 2003/0108240 A1 | 6/2003 | Gutta et al. | 382/181 |
| 2003/0123701 A1 | 7/2003 | Dorrell et al. | |
| 2003/0126267 A1 | 7/2003 | Gutta et al. | 709/229 |
| 2003/0128343 A1 | 7/2003 | Crasnianski et al. | |
| 2003/0135464 A1 | 7/2003 | Mourad et al. | |
| 2003/0145323 A1 | 7/2003 | Hendricks et al. | |
| 2003/0156134 A1 | 8/2003 | Kim | |
| 2003/0174837 A1 | 9/2003 | Candelore et al. | |
| 2003/0196164 A1 | 10/2003 | Gupta et al. | |
| 2003/0202124 A1 | 10/2003 | Alden | |
| 2003/0208466 A1 | 11/2003 | Stern | |
| 2003/0208469 A1 | 11/2003 | Stern | |
| 2003/0229549 A1 | 12/2003 | Wolinsky et al. | |
| 2003/0233438 A1 | 12/2003 | Hutchinson et al. | |

(56) References Cited

U.S. PATENT DOCUMENTS

| | | |
|---|---|---|
| 2003/0236886 A1 | 12/2003 | Oren et al. |
| 2004/0017390 A1 | 1/2004 | Knowlton et al. ............ 345/731 |
| 2004/0031062 A1 | 2/2004 | Lemmons ..................... 725/136 |
| 2004/0073430 A1 | 4/2004 | Desai et al. ................. 704/270.1 |
| 2004/0073916 A1 | 4/2004 | Petrovic et al. |
| 2004/0081338 A1 | 4/2004 | Takenaka ..................... 382/118 |
| 2004/0111467 A1 | 6/2004 | Willis |
| 2004/0111468 A1 | 6/2004 | Enomoto |
| 2004/0128309 A1 | 7/2004 | Gurney et al. ................ 707/102 |
| 2004/0158858 A1 | 8/2004 | Paxton et al. |
| 2004/0194128 A1 | 9/2004 | McIntyre et al. |
| 2004/0201609 A1 | 10/2004 | Obrador ....................... 345/723 |
| 2004/0202382 A1 | 10/2004 | Pilu |
| 2004/0205508 A1 | 10/2004 | Wecker et al. |
| 2004/0218100 A1 | 11/2004 | Staker et al. |
| 2004/0239681 A1 | 12/2004 | Robotham et al. |
| 2004/0249864 A1 | 12/2004 | Laumen et al. |
| 2005/0008242 A1 | 1/2005 | Liege et al. |
| 2005/0008246 A1 | 1/2005 | Kinjo .......................... 382/254 |
| 2005/0028191 A1 | 2/2005 | Sullivan et al. ................ 725/28 |
| 2005/0028193 A1 | 2/2005 | Candelore et al. |
| 2005/0028217 A1 | 2/2005 | Marler et al. |
| 2005/0071888 A1 | 3/2005 | Girouard et al. ............. 725/136 |
| 2005/0076359 A1 | 4/2005 | Pierson et al. .................. 725/32 |
| 2005/0086069 A1 | 4/2005 | Watson et al. ................... 705/1 |
| 2005/0086703 A1 | 4/2005 | Gupta et al. |
| 2005/0108754 A1 | 5/2005 | Carhart et al. |
| 2005/0114214 A1 | 5/2005 | Itoh |
| 2005/0144635 A1 | 6/2005 | Boortz |
| 2005/0160368 A1 | 7/2005 | Liu et al. |
| 2005/0161368 A1 | 7/2005 | Gillespie et al. |
| 2005/0198686 A1 | 9/2005 | Krause et al. ................. 725/118 |
| 2005/0204287 A1 | 9/2005 | Wang .......................... 715/716 |
| 2005/0204381 A1 | 9/2005 | Ludvig et al. .................. 725/34 |
| 2005/0225566 A1 | 10/2005 | Kojo |
| 2005/0240661 A1 | 10/2005 | Heller et al. |
| 2005/0270372 A1 | 12/2005 | Henninger, III |
| 2005/0278256 A1 | 12/2005 | Vandewater et al. |
| 2005/0278731 A1 | 12/2005 | Cameron et al. |
| 2006/0015904 A1 | 1/2006 | Marcus |
| 2006/0020962 A1 | 1/2006 | Stark et al. |
| 2006/0041431 A1 | 2/2006 | Maes .......................... 704/270.1 |
| 2006/0047956 A1 | 3/2006 | Calvin |
| 2006/0053365 A1 | 3/2006 | Hollander et al. |
| 2006/0064384 A1 | 3/2006 | Mehrotra et al. |
| 2006/0069798 A1 | 3/2006 | Li et al. ........................ 709/231 |
| 2006/0069987 A1 | 3/2006 | Jones et al. |
| 2006/0104480 A1 | 5/2006 | Fleisher ....................... 382/103 |
| 2006/0123246 A1 | 6/2006 | Vantalon et al. |
| 2006/0123462 A1 | 6/2006 | Lunt et al. ........................ 726/1 |
| 2006/0125930 A1 | 6/2006 | Mindrum et al. |
| 2006/0129908 A1 | 6/2006 | Markel |
| 2006/0130119 A1 | 6/2006 | Candelore et al. |
| 2006/0130121 A1 | 6/2006 | Candelore et al. |
| 2006/0143560 A1 | 6/2006 | Gupta et al. |
| 2006/0161838 A1 | 7/2006 | Nydam et al. |
| 2006/0161850 A1 | 7/2006 | Seaberg ....................... 715/744 |
| 2006/0168285 A1 | 7/2006 | Nielsen et al. ................ 709/231 |
| 2006/0171423 A1 | 8/2006 | Helms et al. |
| 2006/0171453 A1 | 8/2006 | Rohlfing et al. |
| 2006/0178997 A1 | 8/2006 | Schneck et al. |
| 2006/0179403 A1 | 8/2006 | Kirkpatrick |
| 2006/0195789 A1 | 8/2006 | Rogers et al. ................ 715/727 |
| 2006/0212805 A1 | 9/2006 | Allen et al. |
| 2006/0238380 A1 | 10/2006 | Kimchi et al. |
| 2006/0253330 A1 | 11/2006 | Maggio et al. |
| 2006/0253783 A1 | 11/2006 | Vronay et al. ................ 715/730 |
| 2006/0271980 A1 | 11/2006 | Mankovitz |
| 2006/0277454 A1 | 12/2006 | Chen |
| 2006/0282319 A1 | 12/2006 | Maggio |
| 2006/0287916 A1 | 12/2006 | Starr et al. ...................... 705/14 |
| 2007/0002360 A1* | 1/2007 | Levien et al. ................ 358/1.14 |
| 2007/0006077 A1 | 1/2007 | Grubbs |
| 2007/0016847 A1 | 1/2007 | Reichardt et al. |
| 2007/0044011 A1 | 2/2007 | Cottrille et al. |
| 2007/0050718 A1 | 3/2007 | Moore et al. |
| 2007/0061838 A1 | 3/2007 | Grubbs et al. |
| 2007/0083571 A1 | 4/2007 | Meller et al. |
| 2007/0094418 A1 | 4/2007 | Reisman ........................... 710/1 |
| 2007/0097955 A1 | 5/2007 | Li et al. |
| 2007/0098267 A1 | 5/2007 | Lee et al. |
| 2007/0100648 A1 | 5/2007 | Borquez et al. |
| 2007/0100698 A1 | 5/2007 | Neiman et al. |
| 2007/0101247 A1 | 5/2007 | Matsuki et al. |
| 2007/0101271 A1 | 5/2007 | Hua et al. ..................... 715/731 |
| 2007/0153091 A1 | 7/2007 | Watlington et al. |
| 2007/0168853 A1 | 7/2007 | Jarman |
| 2007/0199025 A1 | 8/2007 | Angiolillo et al. .............. 725/47 |
| 2007/0208751 A1 | 9/2007 | Cowan et al. ................... 707/10 |
| 2008/0034401 A1 | 2/2008 | Wang |
| 2008/0077595 A1 | 3/2008 | Leebow ......................... 707/10 |
| 2008/0109306 A1 | 5/2008 | Maigret et al. ................. 705/14 |
| 2008/0117295 A1 | 5/2008 | Ebrahimi et al. |
| 2008/0120154 A1 | 5/2008 | Dellovo ............................ 705/7 |
| 2008/0127298 A1 | 5/2008 | Reeves et al. |
| 2008/0134282 A1 | 6/2008 | Fridman et al. .................. 726/1 |
| 2008/0154633 A1 | 6/2008 | Ishibashi et al. |
| 2008/0163365 A1 | 7/2008 | Austin et al. .................. 726/26 |
| 2008/0172689 A1 | 7/2008 | Feder et al. .................... 725/28 |
| 2008/0178068 A1 | 7/2008 | Chaudhri |
| 2008/0184098 A1 | 7/2008 | Chen et al. |
| 2008/0189591 A1 | 8/2008 | Lection ........................ 715/202 |
| 2008/0267403 A1 | 10/2008 | Boult ............................ 380/255 |
| 2009/0063496 A1 | 3/2009 | Cunningham et al. |
| 2009/0113279 A1 | 4/2009 | Monro et al. |
| 2009/0154806 A1 | 6/2009 | Chang et al. |
| 2009/0177542 A1 | 7/2009 | Haberman et al. |
| 2009/0222489 A1 | 9/2009 | Sudoh et al. |
| 2009/0327848 A1 | 12/2009 | Glazer et al. |
| 2010/0042503 A1 | 2/2010 | Farmer ....................... 705/14.72 |
| 2010/0083077 A1 | 4/2010 | Paulsen et al. |
| 2010/0131833 A1 | 5/2010 | Chaudhri ..................... 715/201 |
| 2010/0192175 A1 | 7/2010 | Bachet et al. |
| 2011/0047487 A1 | 2/2011 | Deweese et al. .............. 715/758 |
| 2012/0005034 A1 | 1/2012 | Jarman et al. ................ 705/26.1 |
| 2012/0109072 A1 | 5/2012 | Tabata et al. .................. 604/192 |
| 2012/0195789 A1 | 8/2012 | Huang et al. .................. 420/546 |
| 2013/0117131 A1 | 5/2013 | Robinson et al. .......... 705/14.72 |
| 2013/0226974 A1 | 8/2013 | Cosic ................ G06F 17/30289 |

OTHER PUBLICATIONS

Lamay, Craig; "Public Service Advertising, Broadcasters, and the Public Interest, Regulatory Background and the Digital Future"; Shouting to be Heard, Public Service Advertising in a New Media Age; bearing a date of 2002; pp. 7-13.
U.S. Appl. No. 12/455,301, filed May 29, 2009, Cohen et al.
U.S. Appl. No. 12/384,217, filed Mar. 31, 2009, Cohen et al.
U.S. Appl. No. 12/384,213, filed Mar. 31, 2009, Cohen et al.
U.S. Appl. No. 12/380,570, filed Feb. 27, 2009, Cohen et al.
U.S. Appl. No. 12/322,605, filed Feb. 3, 2009, Cohen et al.
U.S. Appl. No. 12/322,372, filed Jan. 29, 2009, Cohen et al.
U.S. Appl. No. 11/906,988, filed Oct. 3, 2007, Cohen et al.
U.S. Appl. No. 11/903,193, filed Sep. 19, 2007, Cohen et al.
U.S. Appl. No. 11/897,989, filed Aug. 30, 2007, Cohen et al.
U.S. Appl. No. 11/894,026, filed Aug. 26, 2007, Cohen et al.
U.S. Appl. No. 11/827,140, filed Jul. 9, 2007, Cohen et al.
U.S. Appl. No. 11/827,106, filed Jul. 9, 2007, Cohen et al.
U.S. Appl. No. 11/824,515, filed Jun. 29, 2007, Cohen et al.
U.S. Appl. No. 11/823,483, filed Jun. 26, 2007, Cohen et al.
U.S. Appl. No. 11/823,473, filed Jun. 26, 2007, Cohen et al.
U.S. Appl. No. 11/807,353, filed May 25, 2007, Cohen et al.
U.S. Appl. No. 11/807,352, filed May 25, 2007, Cohen et al.
U.S. Appl. No. 11/807,350, filed May 25, 2007, Cohen et al.
U.S. Appl. No. 11/796,570, filed Apr. 26, 2007, Cohen et al.
U.S. Appl. No. 11/731,795, filed Mar. 30, 2007, Cohen et al.
U.S. Appl. No. 11/731,738, filed Mar. 30, 2007, Cohen et al.
U.S. Appl. No. 11/728,729, filed Mar. 26, 2007, Jung et al.
U.S. Appl. No. 11/701,527, filed Jan. 31, 2007, Jung et al.
U.S. Appl. No. 11/701,524, filed Jan. 31, 2007, Jung et al.
U.S. Appl. No. 11/701,167, filed Jan. 31, 2007, Jung et al.

(56) References Cited

OTHER PUBLICATIONS

U.S. Appl. No. 11/195,358, filed Aug. 2, 2005, Levien et al.
U.S. Appl. No. 11/195,346, filed Aug. 2, 2005, Levien et al.
U.S. Appl. No. 11/174,432, filed Jul. 1, 2005, Levien, et al.
U.S. Appl. No. 11/173,990, filed Jul. 1, 2005, Levien et al.
"BA cuts Branson from Bond movie"; BBC News; bearing a date of Apr. 21, 2007; p. 1; located at http://news.bbc.co.uk/go/pr/fr/-/2/hi/entertainment/6579839.stm; printed on Apr. 21, 2007.
Boll et al.; "A Cross-Media Adaption Strategy for Multimedia Presentations"; ACM Multimedia; bearing a date of 1999; pp. 37-46.
Dionisio et al.; "A Unified Data Model for Representing Multimedia, Timeline, and Simulation Data"; IEEE; Sep./Oct. 1998; pp. 746-767; vol. 10, No. 5.
Lin, Eugene T., et al.; "Detection of Image Alterations Using Semi-Fragile Watermarks"; bearing a date of 2000; Google 2000; pp. 1-12.
Maes, Frederik, et al.; "Multimodality Image Registration by Maximization of Mutual Information"; IEEE Transactions on Medical Imaging; bearing a date of Apr. 1997; pp. 187-198; vol. 16.; No. 2.
"Premiere Screenshots" (Adobe Premiere Pro 1.5, Adobe Systems Inc., Mar. 2004, total of 7 pages.
"Robust video transmission using MPEG Markup Language and adaptive error correction codes"—(abstract); bearing a date of 2007; p. 1; located at http://ieeexplore.ieee.org/xpls/absprintf.jsp?arnumber=1394682; printed on Jan. 7, 2008.
Rosenberg, Jacob; "Adobe ® Premiere Pro ® 1.5 Studio Techniques"; Jun. 28, 2004; total of 8 pages; Adobe Press.
Smith et al.; "Scalable Multimedia Delivery for Pervasive Computing"; ACM Multimedia; bearing a date of 1999; pp. 131-140.
Sun, Xiaoming; Kuo, C.-C. Jay; "Robust video transmission using MPEG Markup Language and adaptive error correction codes"; IEEE International Conference on Multimedia and Expo; bearing a date of Jun. 27-30, 2004; pp. 2107-2110 ; vol. 3; IEEE.
White, Ron; "How Computers Work, Millennium Edition"; Sep. 1999; pp. 1-284; Que Corp.; Indianapolis, IN.
Wang, Ching-Te et al.; "Detecting and restoring the tampered images based on iteration-free fractal compression"; The Journal of Systems and Software; bearing a date of 2003; pp. 131-140; vol. 67; © 2002 Elsevier Inc.
Zhou, Tina T.; Jin, Jesse S.; "Principles of Video Annotation Markup Language (VAML)"; Pan-Sydney Area Workshop on Visual Information Processing; bearing a date of 2004; pp. 123-127; Australian Computer Society, Inc.
Franklin et al.; "Web 2.0 for Content for Learning and Teaching in Higher Education"; bearing a date of May 28, 2007; pp. 1-29.
Tanaka, Yuzuru; "A Meme Media Architecture for Fine-Grain Component Software"; Division of Electronics and Information Engineering, Hokkaido University; 1996; pp. 190-214; Sapporo, Japan.
Duan et al.; "Adult Image Detection Method Base-on Skin Color Model and Support Vector Machine"; ACCV2002: The 5$^{th}$ Asian Conference on Computer Vision; Jan. 23-25, 2002; pp. 1-4; Melbourne, Australia.
Ap-Apid, Rigan; "An Algorithm for Nudity Detection"; College of Computer Studies De La Salle University; pp. 1-6; As provided by Examiner: Google 2006; created on May 9, 2014; Manila Philippines.

* cited by examiner

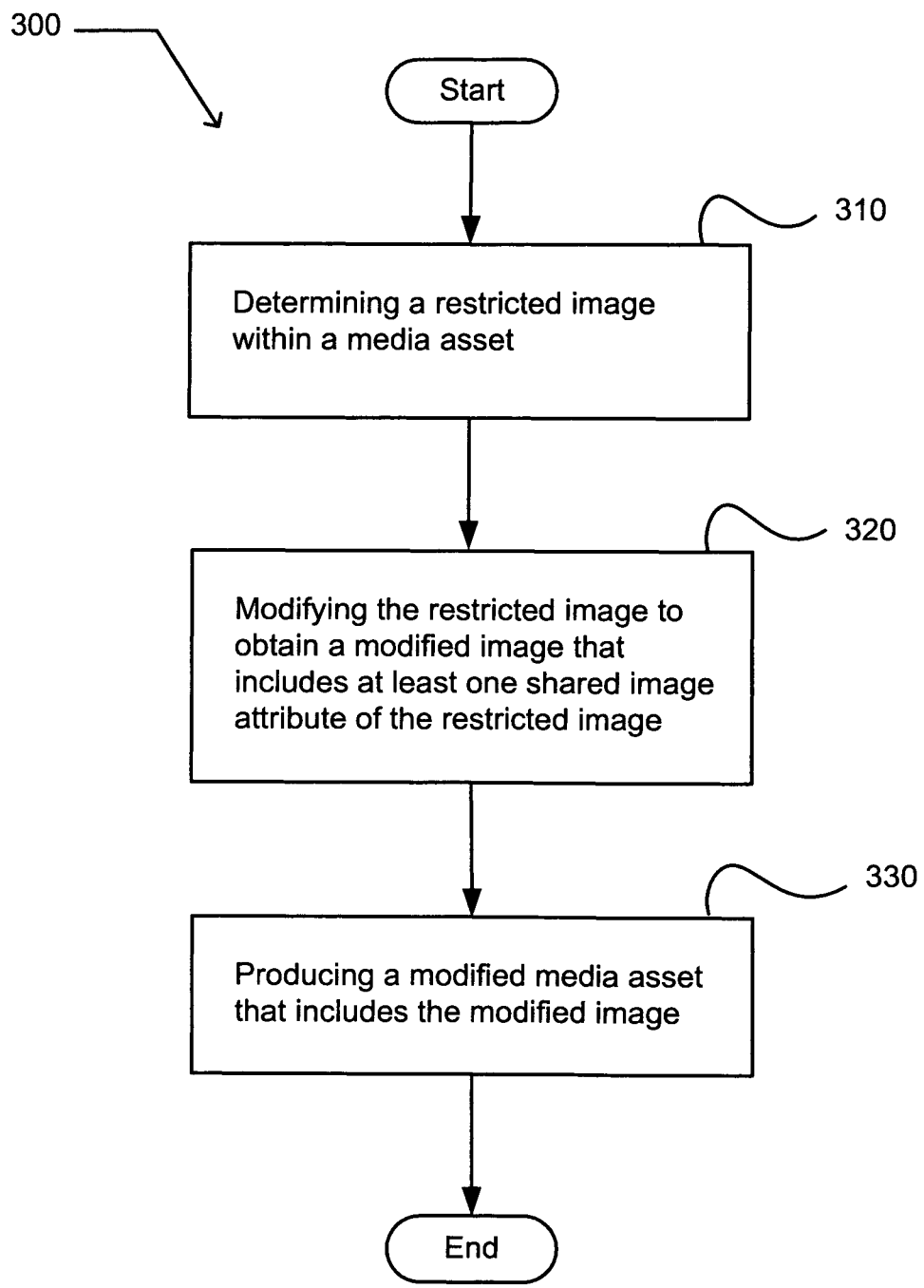

MODIFYING RESTRICTED IMAGES

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants both reference a serial number and indicate whether an application is a continuation or continuation in part. Kunin, Benefit of Prior-Filed Application, USPTO Electronic Official Gazette, Mar. 18, 2003 available on the website of the USPTO at www.uspto.gov/web/offices/com/sol/og/2003/week11/patbene.htm. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

RELATED APPLICATIONS

For purposes of the USPTO extra-statutory requirements, the present application constitutes a continuation of currently pending U.S. patent application Ser. No. 12/928,448,entitled MODIFYING RESTRICTED IMAGES, naming Royce A. Levien; Robert W. Lord; Mark A. Malamud; and John D. Rinaldo, Jr. as inventors, filed Dec. 9, 2010. For purposes of the USPTO extra-statutory requirements, the present application constitutes a continuation of U.S. patent application Ser. No. 11/195,358 entitled MODIFYING RESTRICTED IMAGES, naming Royce A. Levien; Robert W. Lord; Mark A. Malamud; and John D. Rinaldo, Jr. as inventors, filed on Aug. 2, 2005, and issued Dec. 28, 2010 as U.S. Pat. No. 7,860,342. For purposes of the USPTO extra-statutory requirements, the present application constitutes a continuation of U.S. patent application Ser. No. 11/195,346, entitled RESTORING MODIFIED ASSETS, naming Royce A. Levien; Robert W. Lord; Mark A. Malamud; and John D. Rinaldo, Jr. as inventors, filed Aug. 2, 2005 and abandoned on Jul. 5, 2011. For purposes of the USPTO extra-statutory requirements, the present application constitutes a continuation of U.S. patent application Ser. No. 11/173,990, entitled TECHNIQUES FOR IMAGE GENERATION, naming Royce A. Levien; Robert W. Lord; Mark A. Malamud; and John D. Rinaldo, Jr. as inventors, filed Jul. 1, 2005. For purposes of the USPTO extra-statutory requirements, the present application constitutes a continuation U.S. patent application Ser. No. 11/174,432, entitled PROVIDING PROMOTIONAL CONTENT, naming Royce A. Levien; Robert W. Lord; Mark A. Malamud; and John D. Rinaldo, Jr. as inventors, filed Jul. 1, 2005. The foregoing applications are either currently co-pending, or are applications of which a currently co-pending application is entitled to the benefit of the filing date.

SUMMARY

An embodiment provides a method. In one implementation, the method includes but is not limited to determining a restricted image within a media asset, modifying the restricted image to obtain a modified image that includes at least one shared image attribute of the restricted image, and producing a modified media asset that includes the modified image. In addition to the foregoing, other method aspects are described in the claims, drawings, and text forming a part of the present disclosure.

An embodiment provides a computer program product. In one implementation, the computer program product includes but is not limited to a signal bearing medium bearing at least one of one or more instructions for determining a restricted image within a media asset, one or more instructions for modifying the restricted image to obtain a modified image that includes at least one shared image attribute of the restricted image, and one or more instructions for producing a modified media asset that includes the modified image. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to determine a restricted image within a media asset, modify the restricted image to obtain a modified image that includes at least one shared image attribute of the restricted image, and produce a modified media asset that includes the modified image. In addition to the foregoing, other system aspects are described in the claims, drawings, and text forming a part of the present disclosure.

An embodiment provides a device. In one implementation, the device includes but is not limited to a processing system, the processing system comprising recognition logic that is operable to determine a restricted image within a media asset, and modification logic that is operable to modify the restricted image to obtain a modified image that includes at least one shared image attribute of the restricted image. In addition to the foregoing, other device aspects are described in the claims, drawings, and text forming a part of the present disclosure.

An embodiment provides another method. In one implementation, the method includes but is not limited to providing a media asset to a processing system for recognition of a restricted image contained therein, and receiving a modified media asset in which the restricted image has been modified to include a modified image. In addition to the foregoing, other method aspects are described in the claims, drawings, and text forming a part of the present disclosure.

An embodiment provides another method, in one implementation, the method includes but is not limited to determining an image, and modifying the image to obtain an anonymized image. In addition to the foregoing, other method aspects are described in the claims, drawings, and text forming a part of the present disclosure.

An embodiment provides a computer program product. In one implementation, the computer program product includes but is not limited to a signal bearing medium bearing at least one of one or more instructions for determining an image, and one or more instructions for modifying the image to obtain an anonymized image. In addition to the foregoing, other computer program product aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other embodiments are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE DRAWINGS

FIG. 3 illustrates an operational flow representing example operations that produce a modified media asset that includes a modified image.

The use of the same symbols in different drawings typically indicates similar or identical items.

DETAILED DESCRIPTION

Figure 1:
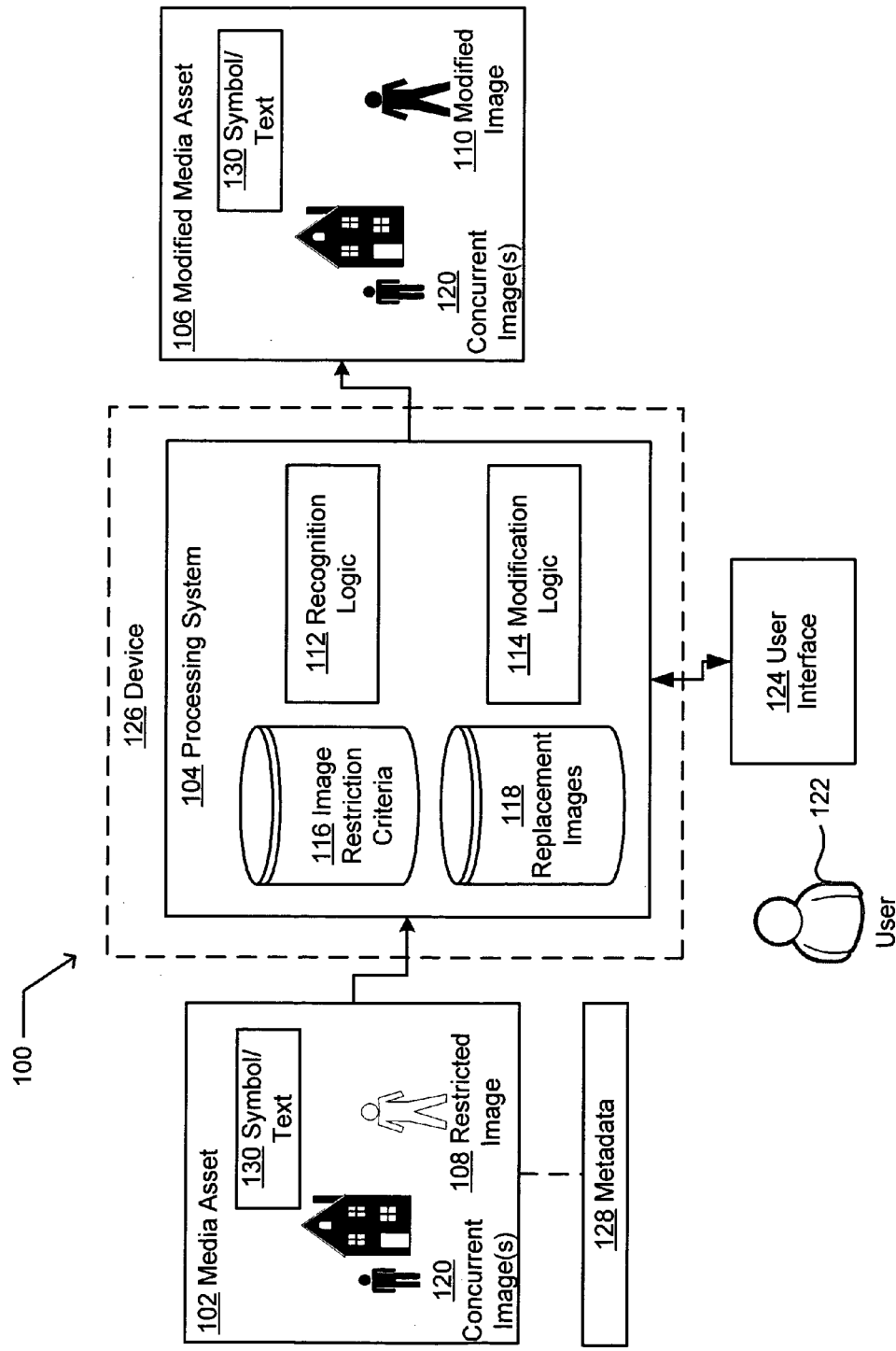
FIG. 1 illustrates an example system in which embodiments may be implemented, perhaps in a device.

FIG. 1 illustrates an example system 100 in which embodiments may be implemented, perhaps in the context of a device. In FIG. 1, a media asset 102 is illustrated as being received at a processing system 104 and thereafter output by the processing system 104 as a modified media asset 106. More specifically, the media asset 102 includes a restricted image 108, and the processing system 104 is operable to determine that the restricted image 108 is, in fact, restricted.

The processing system 104 is further operable to modify the media asset 102, and in particular, to modify the restricted image 108, and thereafter output the modified media asset 106 having a modified image 110. In this way, for example, an identity or other information about the restricted image 108 may be protected, hidden, or obscured, while maintaining a general presentation context of the media asset 102. For example, a person who is a subject of the restricted image 108 may be made anonymous within the modified media asset 106, while inclusion of the modified image 110, which shares attributes of the restricted image 108 (or, at least, shares one common attribute of the restricted image 108), may serve to limit or prevent an observer of the modified media asset 106 from noticing that the modified media asset 110, has, in fact, been modified.

The processing system 104 includes recognition logic 112 that is operable to recognize the restricted nature of the restricted image 108. The processing system 104 also includes modification logic 114 that is operable to modify the media asset 102 (including the restricted image 108) to obtain the modified media asset 106 and the modified image 110.

As described in more detail below, the recognition logic 112 may determine the restricted image 108 within the media asset 102 using image restriction criteria 116. As also described in more detail below, the modification logic 114 may obtain/create the modified image 110 by accessing a number of stored or accessible replacement images 118. Specific examples of operations involving these elements of the processing system 104 are provided in the context of various operational flows.

Generally speaking, however, the recognition logic 112 may operate to analyze various attributes of the media asset 102, including attributes of the restricted image 108, in order to determine a restricted nature of the restricted image 108. One example of attributes of the media asset 102 that is illustrated in FIG. 1 includes concurrent image(s) 120, i.e., the recognition logic 112 may make a determination that the restricted image 108 is restricted based on a presence or absence of the concurrent image(s) 120, or based on the presence or absence of certain attributes of the concurrent image(s) 120. Of course, attributes of the media asset 102 are not necessarily limited to image characteristics of the media asset 102, and also may include, for example, metadata associated with the media asset 102, an identity of a person, place, or thing within or in association with the restricted image 108, or information related to a person and/or device involved in capturing the media asset 102.

Further in FIG. 1, a user 122 accesses the processing system 104 by way of a user interface 124. In this way, the user 122 may, for example, submit the media asset 102 to the processing system 104, or receive the modified media asset 106 from the processing system 104, or may become involved in operations of the processing system 104. The user interface 124 also may be used, for example, to define or modify the image restriction criteria 116, or to select the replacement images 118. The user interface 124 also may be used to control a type and/or extent of the recognition performed by the recognition logic 112, or to control a type and/or extent of the modifications performed by the modification logic 114.

Also in FIG. 1, a device 126 is shown in which the processing system 104 may operate. As described in more detail with respect to FIG. 2 and following figures, the device 126 may include in some examples, an image capture device, a print device, a general-purpose computing device, or virtually any other device or combination of devices that may be used to store, transmit, display, or render a media asset.

The processing system 104 also may be operable to perform other processing of the media asset 102, such as, for example, enhancing, editing, displaying, or otherwise improving the media asset 102, or, in other example embodiments, such additional processing may be performed by other external systems (not shown), if needed.

FIG. 1 also illustrates the possibility that the media asset 102 may be associated with metadata 128. For example, a video stream may have an associated closed-captioning stream, or a web page may have metadata associated with content of the page. Typically, such metadata 128 may not be viewable to the user 122, or may only be viewable if some specific action is taken by the user 122. The metadata 128 may be intended by a designer or producer of the media asset 102, or by an intervening user of the media asset 102, to provide additional information or level of enjoyment to the user 122, and may be used by the processing system to assist in, for example, determining the restricted image 108, as described in more detail, below. The metadata 128 may or may not be included within the modified media asset 106.

A symbol or text 130, on the other hand, generally represents information that is included within the media asset 102 for normal viewing. For example, a web page may include a news article that names a person who is pictured in the article. By using the name text, the recognition logic 112 may be able to determine identity or other information regarding the restricted image 108, or the concurrent image(s) 120.

In FIG. 1, it should be understood that any and/or all of the illustrated elements, and other elements, not illustrated, may be in communication with one another according to any known methods, including but not limited to the various communication techniques discussed herein. As such, it should be understood that the various elements need not be located or co-located as illustrated in the example of FIG. 1. For example, in some embodiments, the recognition logic and/or the image restriction criteria 116 may be remote from the processing system 104. Similarly, the user interface 124 may be implemented at a local computing device of the user 122, remote from the processing system 104, or may be a part of the device 126 that may house the processing system 104, as well.

Figure 2A:
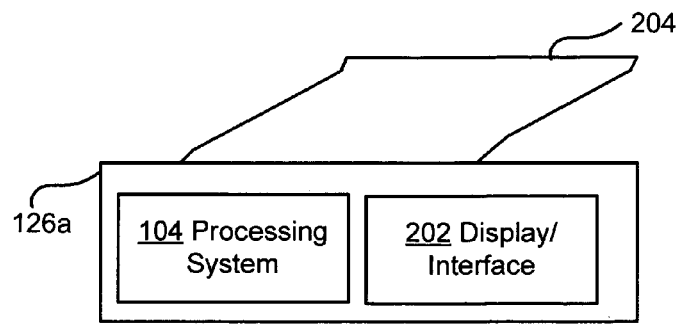
FIGS. 2A-2C illustrate certain alternative embodiments of the device and/or processing system of FIG. 1.
Figure 2B:
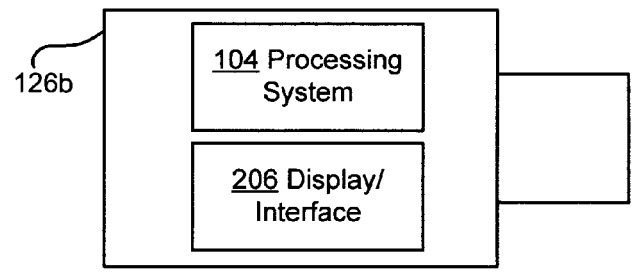
Figure 2C:
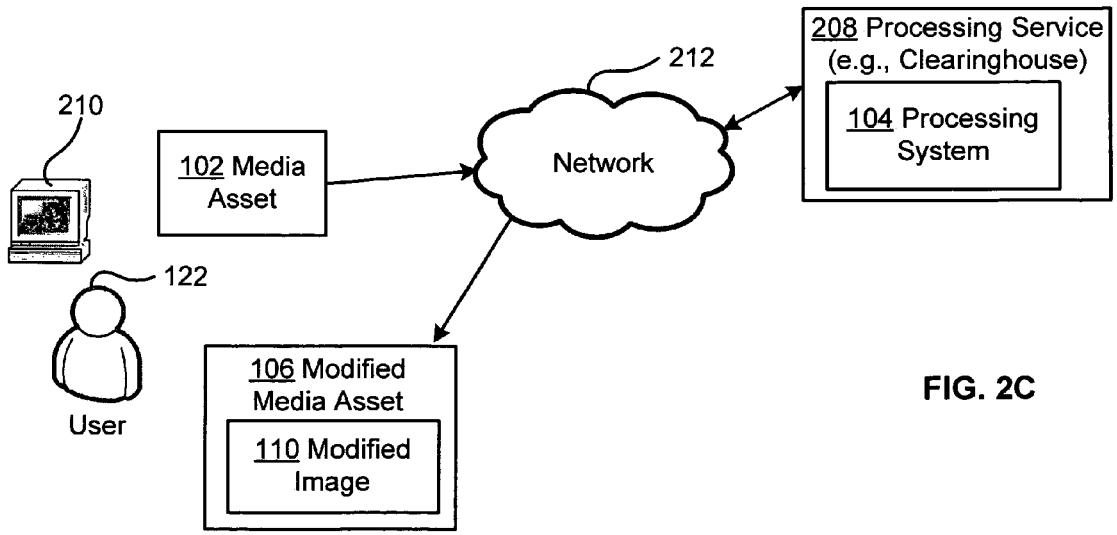

FIGS. 2A-2C illustrate certain alternative embodiments of the device 126 and/or processing system 104 of FIG. 1. In FIG. 2A, the device 126 is illustrated as a printer 126a, which includes the processing system 104 and a display 202. The display 202 may be used to display a preview of a media asset to be printed with the printer 126a, such as, for example, the media asset 102 and/or the modified media asset 106, and, of course, the printer 126a may be used to print the media asset 102 and/or the modified media asset 106 on paper 204, as well.

The display 202 also should be understood to function, in some example embodiments, as the user interface 124. For example, the display 202 may include touch-screen control for operating the printer 126a and/or the processing system 104, or various buttons, keys, or other selection/input devices (not shown) may be used. In additional or alternative embodiments, an external computing device may be connected to the printer 126a for control thereof, including control of the processing system 104.

In FIG. 2B, the device 126 is illustrated as a camera 126b, which, similarly to the printer 126a, includes some or all of the processing system 104, as well as a display 206. As with the printer 126a, the camera 126b (and/or the processing system 104) may be controlled by the user 122, either using the display 206 (and possibly associated controls), or using an external computing device.

In FIG. 2C, the processing system 104 is illustrated as part of a processing service 208, which may be remote from the user 122 at a computing station 210, and in communication therewith by way of a network 212. In such example embodiments, the user 122 may use the workstation 210 to transmit and receive the media asset 102 and/or the modified media asset 106, respectively, in order to obtain the various advantages described herein. In one example, discussed in more detail below, the processing service 208 may operate as a clearinghouse at which media assets of various types and captured by a number of users may be processed, so that any restricted images therein may be modified appropriately.

In FIG. 3 and in following figures that include various examples of operational flows, discussion and explanation may be provided with respect to the above-described examples of FIGS. 1, 2A, 2B, and 2C, and/or with respect to other examples and contexts. However, it should be understood that the operational flows may be executed in a number of other environment and contexts, and/or in modified versions of FIGS. 1, 2A, 2B, and 2C. Also, although the various operational flows are presented in the sequence(s) illustrated, it should be understood that the various operations may be performed in other orders than those which are illustrated, or may be performed concurrently.

FIG. 3 illustrates an operational flow 300 representing example operations that produce the modified media asset 106. After a start operation, the operational flow 300 moves to a determining operation 310 where the restricted image 108 is determined to be included within the media asset 102. For example, the recognition logic 112 of the processing system 104 may determine that the restricted image 108 is of a person, place, or thing that is not to be included within produced (modified) versions of the media asset 102.

At a modifying operation 320, the restricted image 108 is modified to obtain a modified image that includes at least one shared image attribute of the restricted image. For example, as in FIG. 1, the modification logic 114 may operate to replace an image of a person or a part of a person with a new or separate image of another person. In this case, the shared image attribute could include one or more of a body (part) shape, a shared facial feature or skin tone, a shared gender or race, a shared hair color or body physique, or numerous other examples. Of course, the restricted image need not be of a person, but also may include virtually any object that may be imaged, including places, objects, or landmarks, to name just a few. Further, the restricted image need not be of a single one of these possibilities, but could include multiple people, places, or things, or combinations thereof. Other examples of restricted images and image attributes are provided below.

At an operation 330, the modified media asset 106 is produced that includes the modified image 110. For example, the processing system 104, which may be included in the print device 126a, the camera 126b, or the processing service 208, may output the modified media asset 106 for printing, viewing, storing, or transmitting, as the case may be, for use or enjoyment by, for example, the user 122. The operational flow 300 then moves to an end operation.

In some embodiments, the user 122 may include a person, an entity, and/or a government. Although a user may be shown herein as a single illustrated figure, and/or be described in the singular, those skilled in the art will appreciate that the term user may be representative of one or more human user(s), robotic user(s) (e.g., computational entity), and/or substantially any combination thereof (e.g., a user may be assisted by one or more robotic agents). Further, the user, as set forth herein, even if shown as a single entity, may in fact be composed of two or more entities. Those skilled in the art will appreciate that, in general, the same may be said of "sender" and/or other entity-oriented terms as such terms may be used herein.

In some embodiments, the media asset 102 may include a visual image, a picture, a website, an audio recording, a video stream, and/or an audio stream. In additional or alternative embodiments, the media asset 102 also may include text, such as may be included in an article or other writing, or in a website. The media asset 102 may be embodied in various forms, including but not limited to digital files or transmissions, analog recordings or transmissions, or may be embodied in physical form, such as, for example, on paper, plastic, canvas, wood, or any other physical medium in which text, image, or other representations may be embodied.

The media asset 102 may be received, stored and/or transmitted using typical elements of a computer environment. The media asset 102 (and the modified media asset 106) may be transmitted over a network such as the network 212 of FIG. 2, which may represent, for example, a local area network (LAN), a wide area network (WAN), or a peer-to-peer (P2P) network, or the media asset 102 may be broadcast over the air.

The media asset 102 (and the modified media asset 106) may be captured, received, displayed and/or transmitted, for example and without limitation, using one or more of the following: an electronic device; an appliance; a computing device, such as a personal computer and a server; a limited resource computing device; a pervasive computing device; a personal digital assistant (PDA); a cell phone; a Blackberry appliance; a vehicle, such as a car, boat, and/or aircraft; an X-Box; a home gateway; a set-top box; a television, a radio, a camera; a printer; a digital versatile disc (DVD) recorder or burner; and a TiVo or other digital video recorder (DVR).

Figure 4:
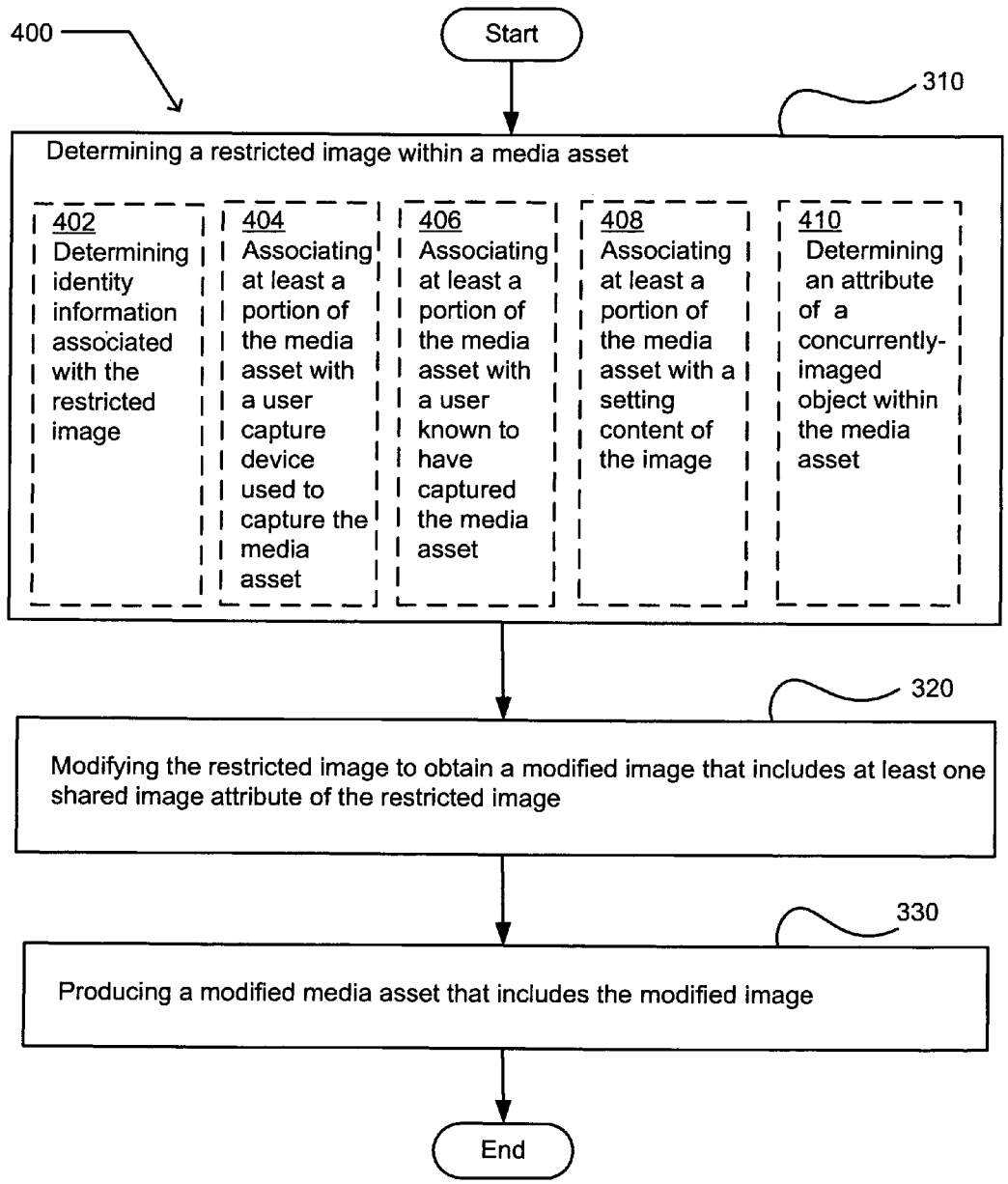
FIG. 4 illustrates an alternative embodiment of the example operational flow of FIG. 3.

FIG. 4 illustrates alternative embodiments of the example operational flow 300 of FIG. 3. FIG. 4 illustrates example embodiments where the determining operation 310 may include at least one additional operation. Additional operations may include operation 402, operation 404, operation 406, operation 408, and/or operation 410.

At the operation 402, identity information associated with the restricted image 108 is determined. For example, the recognition logic 112 may determine identity information of a person within the restricted image information, which may include, for example, a name, an occupation, an association (e.g., as a spouse, relative, friend, or employer/employee), a race, a gender, a body physique, a height, a hair color or hair style, a style of dress, or any other distinguishing information that identifies the person, and, in some examples, that uniquely identifies the person.

Examples of techniques for performing the determining of identity information are described in more detail below. Also, examples of how such identity information may be used by the modification logic 114 to produce the modified image 110 are described in more detail below, although it may be mentioned here that, by determining identity information as described above, it follows that the modified image 110 may include or be associated with different identity information. For example, a person associated with the restricted image 108 may wish to remain anonymous, or otherwise should not be included in the media asset 102, and, in such cases, the modified image 110 may include an anonymized image in which the original identity information is hidden, obscured, replaced, and/or otherwise modified.

As a result, persons such as, for example, movie stars, politicians, professional athletes, or other public figures (or persons with associations thereto, such as spouses or relatives) may have their images and identities restricted. Similar comments apply to persons with government high security or classified status, or other persons having safety measures associated with promulgation of their image(s). Additionally, since the modified image 110 maintains at least one, and possibly many, image attributes of the restricted image 108, and a presentation context of the media asset 102 may be maintained within the modified media asset 110, observers, users, or recipients of the modified media asset 110 may not be aware that such modification has, in fact, taken place.

Of course, similar comments apply not just to persons within the restricted image 108, but to virtually any object that may be imaged and associated with identity information. For example, the restricted image 108 may include a physical place, such as a public or private landmark, a building, or a sports arena, and the identity information associated therewith may be determined by the recognition logic 112. Similarly, any particular object having identity information, such as, for example, a car or type of car, a work of art, an animal, a computer or computing device, a piece of jewelry or clothing, or any other object, may have identity information associated therewith for determining that the associated image is restricted.

At the operation 404, at least a portion of the media asset 102 is associated with a user capture device used to capture the media asset, such as, for example, the camera 126b of FIG. 2. That is, for example, the recognition logic 112 may determine that the media asset 102 was captured by the camera 126b that is restricted from capturing certain images. For example, cameras in a high-security facility, or cameras at an event with a public figure(s) (e.g., a movie star, politician, or professional athlete) may be restricted from capturing images of certain people, places, or things.

At the operation 406, at least a portion of the media asset 102 is associated with a user known to have captured the media asset. For example, the user 122 of FIG. 1 may be a newspaper or television reporter, whose employer may have agreed to restrict image-taking of certain public figures. In this case, as described in more detail below, the recognition logic 112 may associate the media asset 102 or a portion thereof with the user 122 by recognizing the metadata 128 associated with the media asset 102, such as, for example, a marker on the media asset 102 that was imposed by a camera of the user 122 when (or after) the media asset was obtained. In other examples, the user 122 may be required to identify him or herself to the processing system 104 before processing begins, so that the recognition logic 112 may react accordingly.

At the operation 408, at least a portion of the media asset 102 is associated with a setting content of the image. For example, the concurrent image(s) 120 of FIG. 1 may be considered to provide setting content within the media asset 102. In this way, for example, and as referenced above, media assets obtained in a certain location, as reflected within the content of the media asset 102, may be recognized by the recognition logic 112 as containing one or more restricted images. As with virtually all of the operational flows described herein, such an association may be combined for enactment within the recognition logic 112. For example, the recognition logic 112 may determine that if a content setting of the media asset 102 references a setting where certain public figures will be present, and if identity information associated with a person's image within the media asset 102 identifies that person as being a spouse of a public figure, then the recognition logic 112 may cue the modification logic to anonymize the spouse's image by, for example, replacing the spouse's image with that of a replacement image from the replacement images memory 118. Such replacements may be undertaken, for example, based on a wish of the, in this case, spouse, to maintain anonymity.

As another example, the recognition logic 112 may analyze the media asset 102 to determine that the setting content is such that all non-recognized persons should be anonymized. For example, the processing system 104 may receive crime-scene photos in which images of bystanders have been captured. If the recognition logic 112 recognizes, e.g., certain police officers in the media asset 102, then all other bystanders in the background may be anonymized by producing the modified media asset 106 to include replacement images, as just described, or by modifying certain features of the bystanders so as to anonymize the bystanders within the modified media asset.

At the operation 410, an attribute of a concurrently-imaged object within the media asset 102 is determined. For example, an attribute of the concurrent image(s) 120 may be determined, where the concurrent image(s) 120 may include virtually any item that may be imaged within the media asset 102. As mentioned above, the concurrently-imaged object(s) 120 also may be used to determine a setting content of the media asset 102, although the attribute of a concurrently-imaged object reference in operation 410 may refer to any particular imaged item, or attribute thereof, which may or may not be a part of a setting content of the media asset 102.

Figure 5:
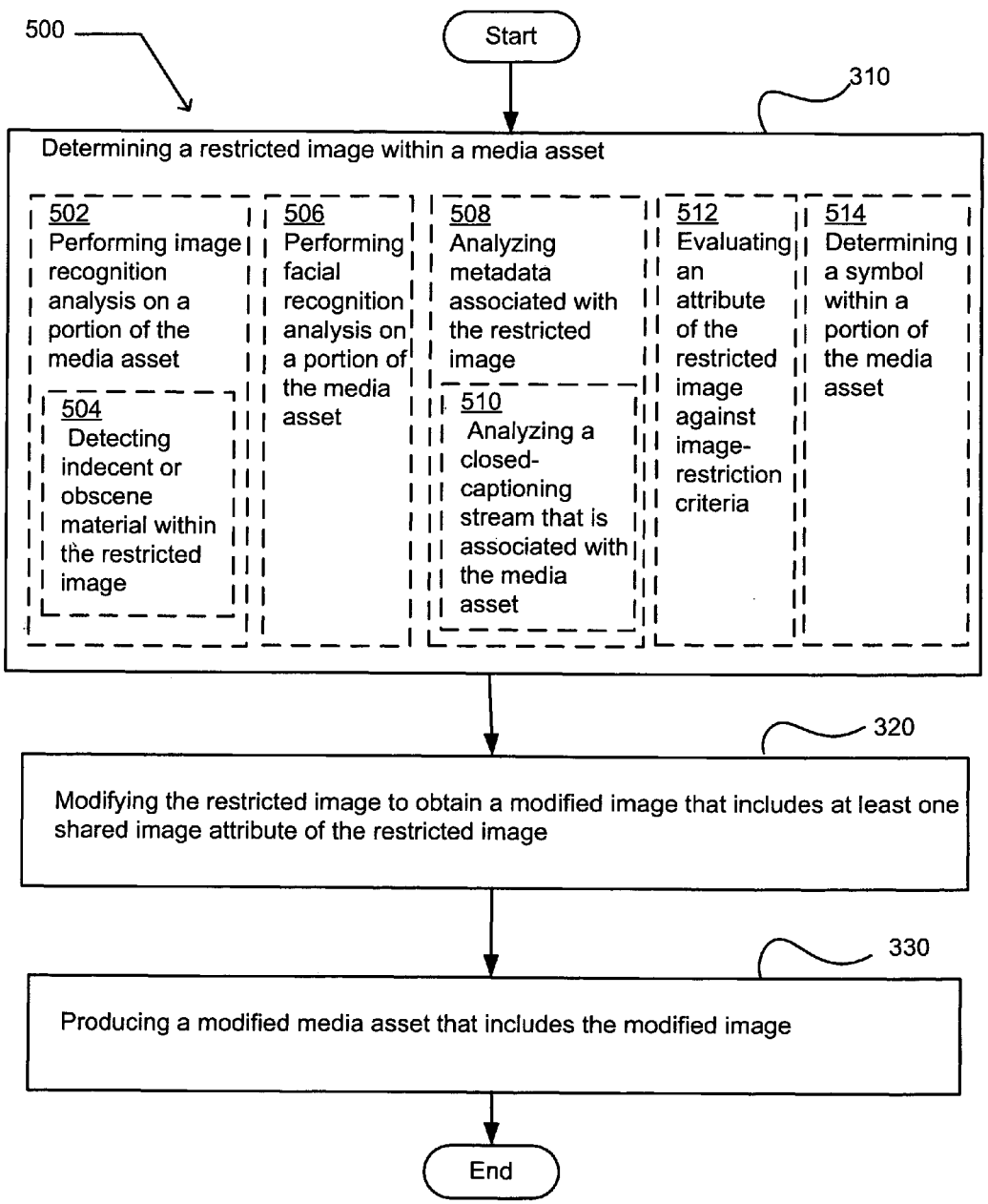
FIG. 5 illustrates another alternative embodiment of the example operational flow of FIG. 3.

FIG. 5 illustrates alternative embodiments of the example operational flow 300 of FIG. 3. FIG. 5 illustrates example embodiments where the determining operation 310 may include at least one additional operation. Additional operations may include operation 502, operation 504, operation 506, operation 508, operation 510, operation 512, and/or operation 514.

At the operation 502, image recognition analysis is performed on a portion of the media asset. For example, the recognition logic 112 may perform image recognition analysis on the restricted image 108 to determine that the restricted image 108 includes an image of a person, or portion thereof, or any other object that may be visually imaged. The image recognition analysis may include, for example, color analysis, pattern-matching, pattern-recognition, or any other technique for recognizing a particular image or type of image. In particular, in an example additional operation 504 that may be performed in addition to, or in association with, operation 502, indecent or obscene material may be detected. For example, the recognition logic 112 may recognize nudity or other restricted imagery within the restricted image 108. In this case, as described in more detail below, later modification of the restricted image 108 may include addition of clothes or other modification of the restricted image, where again, and as opposed to simple blurring or blocking of the restricted image, a presentation context of the restricted image 108 may be maintained, so that an observer of the modified media asset 106 may not notice that such a modification has taken place. As is apparent, moreover, such image recognition analyses may be performed on any part of the media asset 102, including, for example, the concurrent image(s) 120, as part of the determining operation 502.

At the operation 506, facial recognition analysis is performed on a portion of the media asset. For example, the recognition logic 112 may perform a facial recognition analysis on a person within the restricted image 108, or on any other portion of the media asset.

At the operation 508, metadata associated with the restricted image is analyzed. For example, the recognition logic 112 may analyze the media asset 102 to determine and consider any associated metadata 128. For example, where the media asset includes a web page, the recognition logic 112 may analyze portions of the web page, including source code associated with the web page, that may provide information about, for example, any of the factors mentioned herein, or other factors (e.g., identity information, a capturing user or device, a setting content, a concurrently-imaged object, or any other information about the media asset 102 that may be useful to the recognition logic 112 in determining the restricted image 108). In a further example of the operation 508, at the operation 510, a closed-captioning stream that is associated with the media asset 102 is analyzed. For example, the media asset 102 may represent a television show or movie that has an associated closed-captioning stream, which may be analyzed by the recognition logic 112 to assist in making a determination regarding the restricted image 108.

At the operation 512, an attribute of the restricted image is evaluated against image-restriction criteria. For example, the recognition logic 112 may communicate with the image restriction criteria 116 in order to assist in performing recognition processes. In this case, the attribute of the restricted image 108 may include any image attribute mentioned herein, or other attributes, including a size, shape, color, identity, race, gender, physique, an associated capture device or capturing user, or any other attribute. The image restriction criteria 116 may involve, for example, any of the various criteria described herein, such as identity information, setting content, image or facial recognition analysis, metadata, and so on, as well as criteria not explicitly mentioned here. Moreover, the image restriction criteria 116 and recognition logic 112 may interoperate to determine the restricted image 108 based on any combination of these criteria, as may be determined and configured by the user 122 by way of the user interface 124.

At the operation 514, a symbol is determined within a portion of the media asset 102. For example, the symbol or text 130 may be determined by way of text-recognition software, and thereby used to determine identity or other information related to the restricted image 108.

Figure 6:
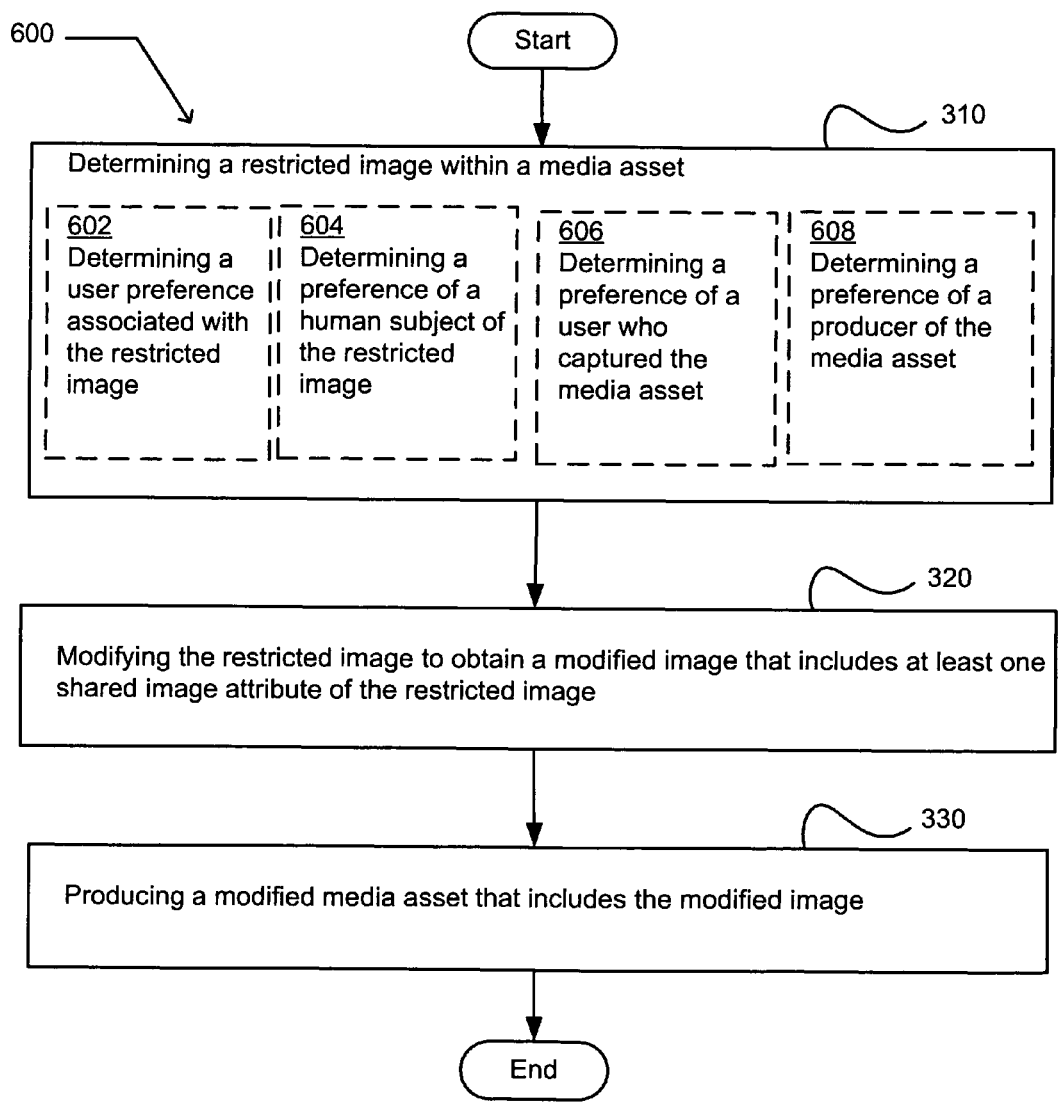
FIG. 6 illustrates another alternative embodiment of the example operational flow of FIG. 3.

FIG. 6 illustrates alternative embodiments of the example operational flow 300 of FIG. 3. FIG. 6 illustrates example embodiments where the determining operation 310 may include at least one additional operation. Additional operations may include operation 602, operation 604, operation 606, and/or operation 608.

At the operation 602, a user preference associated with the restricted image is determined. For example, the user 122 may express a preference as to whether the restricted image 108 should be restricted, and this preference may be coded into the image restriction criteria 116, e.g., again, using the interface 124. The user 122 may represent someone either capturing, transmitting, or reviewing the media asset 102, examples of which are described in more detail, below.

At the operation 604, a preference of a human subject of the restricted image is determined. For example, a public or private figure may express a desire not to be included in the media asset 102. Therefore, if such a person is, in fact, included in the media asset 102, then the recognition logic 112 may recognize the person and, perhaps based on the preference of the person as stored in the image restriction criteria 116, may anonymize the image of the person by, for example, replacing the image with one selected from the replacement images 118, or otherwise by modifying the image.

At the operation 606, a preference of a user who captured the media asset may be determined. For example, the user 122 may be a consumer who has captured several family photographs and wishes to distribute them to friends and relatives, but wishes to anonymize certain subjects of the photographs, perhaps dependent on who is to receive a particular one of the photographs. In this case and analogous cases, the user 122 may provide a preference(s) to the recognition logic 112 defining a level and/or type of anonymization to be provided, with respect to individual image subjects, and/or with respect to recipients of the modified media asset 106, or with respect to one or more other image-restriction criteria, various examples of which are provided herein.

At the operation 608, a preference of a producer of the media asset may be determined. For example, the user 122 may represent an editor of a newspaper who is reviewing a number of photographs taken by staff photographers, among which the media asset 102 may be included. In this case, although the editor may not have captured the media asset 102, he or she may be responsible for producing the modified media asset 106 using the processing system 104. As such, preferences of such a user defining a level and/or type of anonymization to be provided, with respect to the one or more criteria described herein, may be implemented by the recognition logic 112 in determining the restricted image 108 within the media asset 102.

Figure 7:
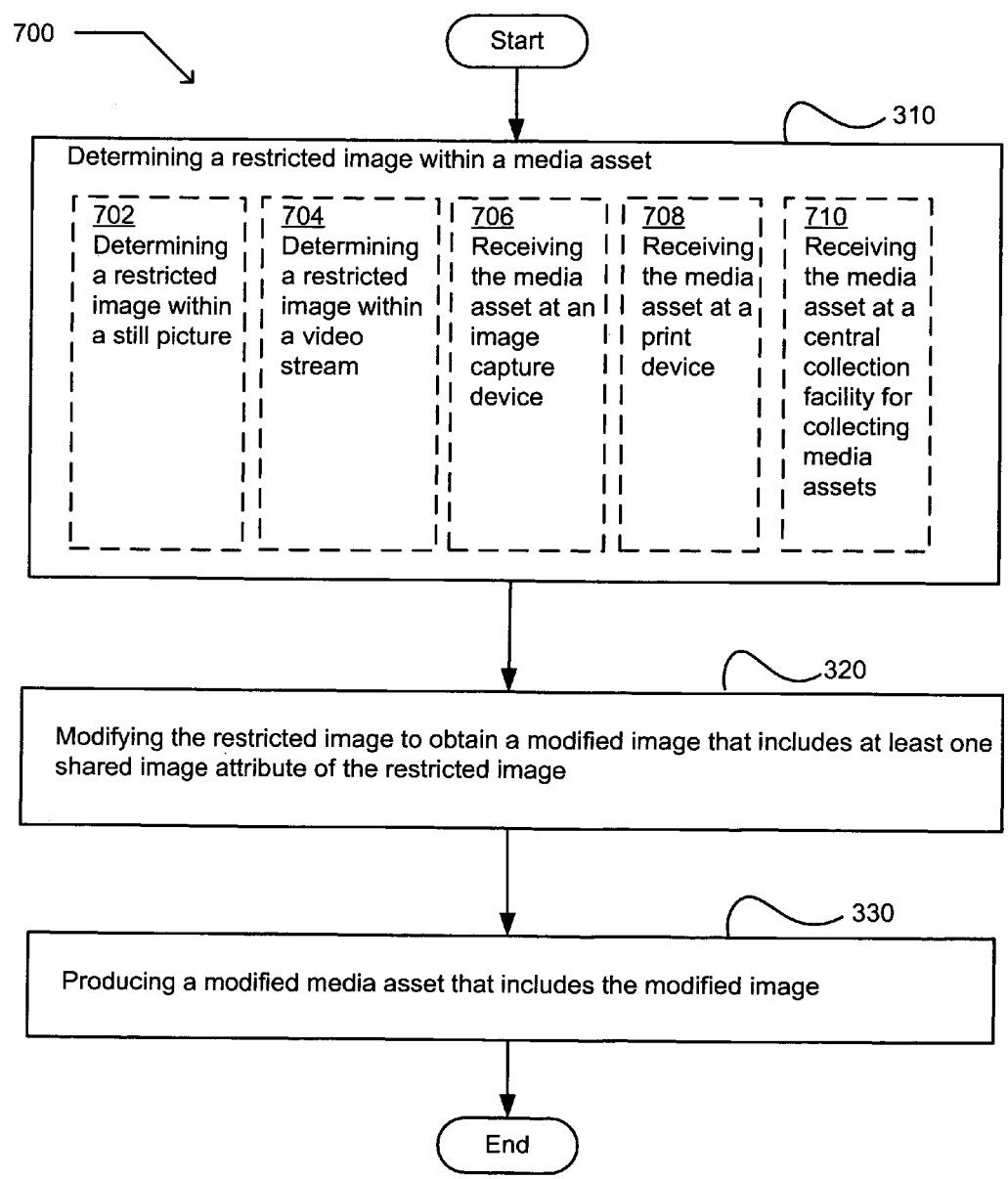
FIG. 7 illustrates another alternative embodiment of the example operational flow of FIG. 3.

FIG. 7 illustrates alternative embodiments of the example operational flow 300 of FIG. 3. FIG. 7 illustrates example embodiments where the determining operation 310 may include at least one additional operation. Additional operations may include operation 702, operation 704, operation 706, operation 708, and/or operation 710.

At the operation 702, a restricted image is determined within a still picture. For example, if the media asset 102 includes a still picture taken by a still camera, such as, for example, an embodiment of the camera 126b of FIG. 2, then the restricted image 108 may be determined to be any image within the still picture.

At the operation 704, a restricted image is determined within a video stream. For example, if the media asset includes any type of video, including Motion Pictures Experts Group (MPEG) video or other format, video recorded or transmitted for display on any television, computer, or other display, then the restricted image 108 may be determined as essentially any discernable element within the video. As just one example, the restricted image 108 may be determined as an image within one or more frames of the video image(s).

At the operation 706, the media asset is received at an image capture device. For example, the media asset 102 may be received at the image capture device 126b of FIG. 2B. As is apparent from the preceding discussion, the image capture device 126b may be any type of, for example, camera, digital camera, web camera (webcam) or video camera, where any of these and others may be disposed within or in association with one or more other devices, such as, for example, a cell phone or personal digital assistant (PDA).

At the operation 708, the media asset may be received at a print device. For example, the media asset 102 may be received at the print device 126a of FIG. 2A, such as when the media asset is downloaded thereto by way of an external computer, and/or by way of a memory card inserted into (or otherwise connected to) the print device 126a. In this way, for example, the print device 126a, as with the camera 126b, may be prevented from producing and/or capturing the restricted image 108.

At the operation 710, the media asset is received at a central collection facility for collecting media assets. For example, as referenced above, the processing service 208 of FIG. 2C may serve as a clearinghouse for a number of users, who may be employees of a single employer. In another example, the processing service 208 may be a commercial enterprise that received media assets from any number of disparate consumers.

Figure 8:
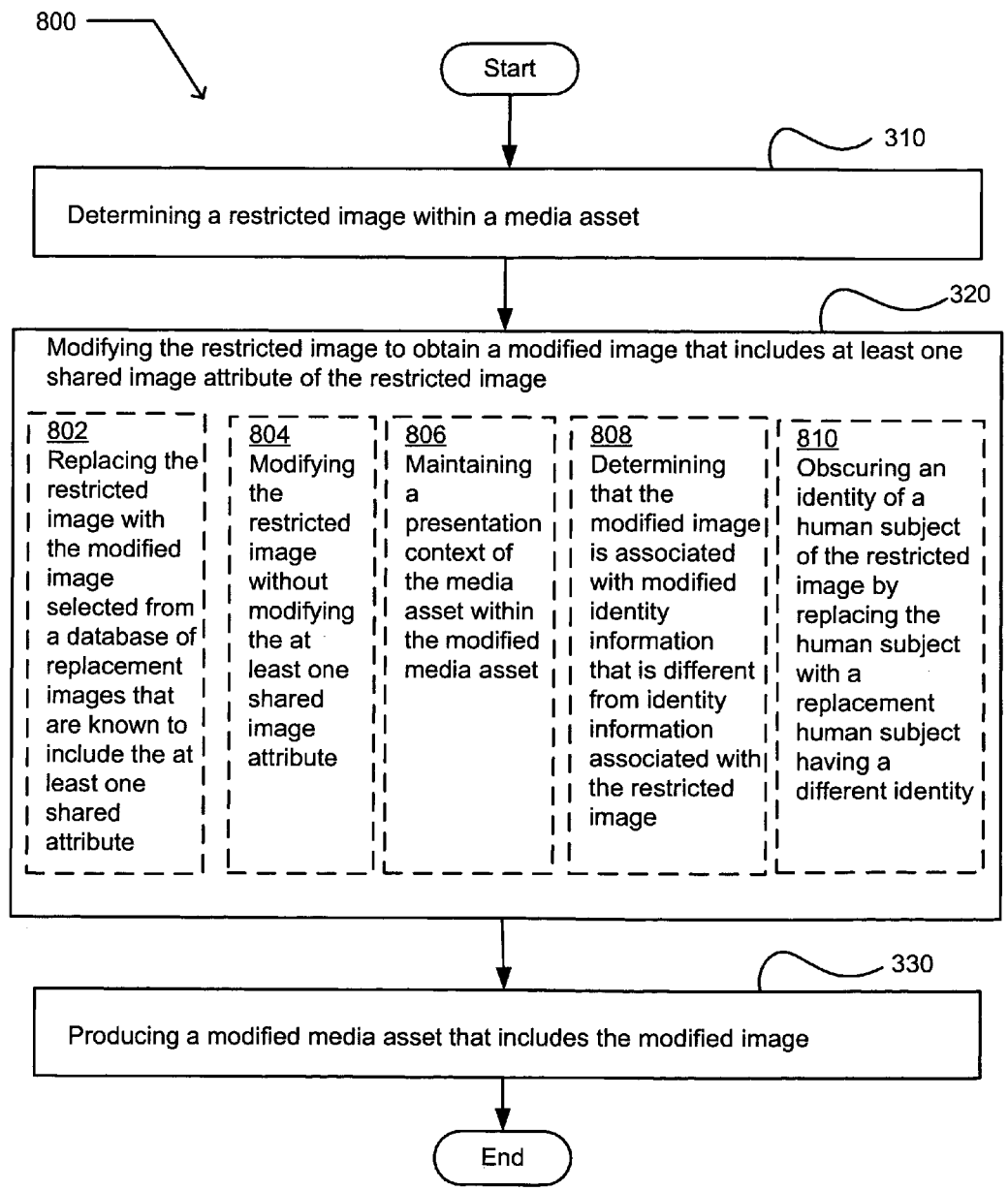
FIG. 8 illustrates an alternative embodiment of the example operational flow of FIG. 3.

FIG. 8 illustrates alternative embodiments of the example operational flow 300 of FIG. 3. FIG. 8 illustrates example embodiments where the modifying operation 320 may include at least one additional operation. Additional operations may include operation 802, operation 804, operation 806, operation 808, and/or operation 810.

At the operation 802, the restricted image is replaced with the modified image selected from a database of replacement images that are known to include the at least one shared attribute. For example, the modified image 110 may be selected from the replacement images memory 118 to overlay the restricted image 108, with appropriate scaling, warping, rotating, color-matching, or any other operation required by the modification logic 114 to insert the replacement image 110.

At the operation 804, the restricted image may be modified without modifying the at least one shared image attribute. For example, and somewhat contrary to the example just given, the restricted image may be altered without a full replacement of the image 108. For example, if the replacement image 108 includes a public figure having brown hair, a certain style of dress, or some other distinguishing characteristic, then such a characteristic may be maintained within the modified image 110. Thus, a person or other object in the restricted image 108 may be anonymized, with a minimum disruption to the media asset 102 as a whole.

At the operation 806, a presentation context of the media asset is maintained within the modified media asset. For example, not only may the concurrent image(s) 120 be maintained within the modified media asset 110, but the modified image 110 itself may be inserted with minimal or no disruption to a continuity of color, lighting, shading, clarity, or other aspects of presentation of the modified media asset.

At the operation 808, the modified image is determined to be associated with modified identity information that is different from identity information associated with the restricted image. For example, as referred to above, it may be the case that the processing system 104 is operable to anonymize a figure or object, e.g., a person, within the restricted image 108. In this way, privacy or security concerns of the anonymized figure, or of any other entity (e.g., the operator or manager of a venue), may be addressed. By ensuring that the identity information (e.g., name, facial features, occupation, or any other identity information) associated with the modified image 110 is different from identity information associated with the restricted image 108, at least one aspect of the anonymization of the figure is provided.

At the operation 810, an identity of a human subject of the restricted image is obscured by replacing the human subject with a replacement human subject having a different identity. For example, and similarly to some of the examples already given, a human subject in the restricted image 108 of FIG. 1 may be replaced, perhaps using an image from the replacement images database 118, where the modification logic 114 is operable to determine the identity of the human subject, perhaps in conjunction with the image restriction criteria 116 and/or the recognition logic 112.

Figure 9:
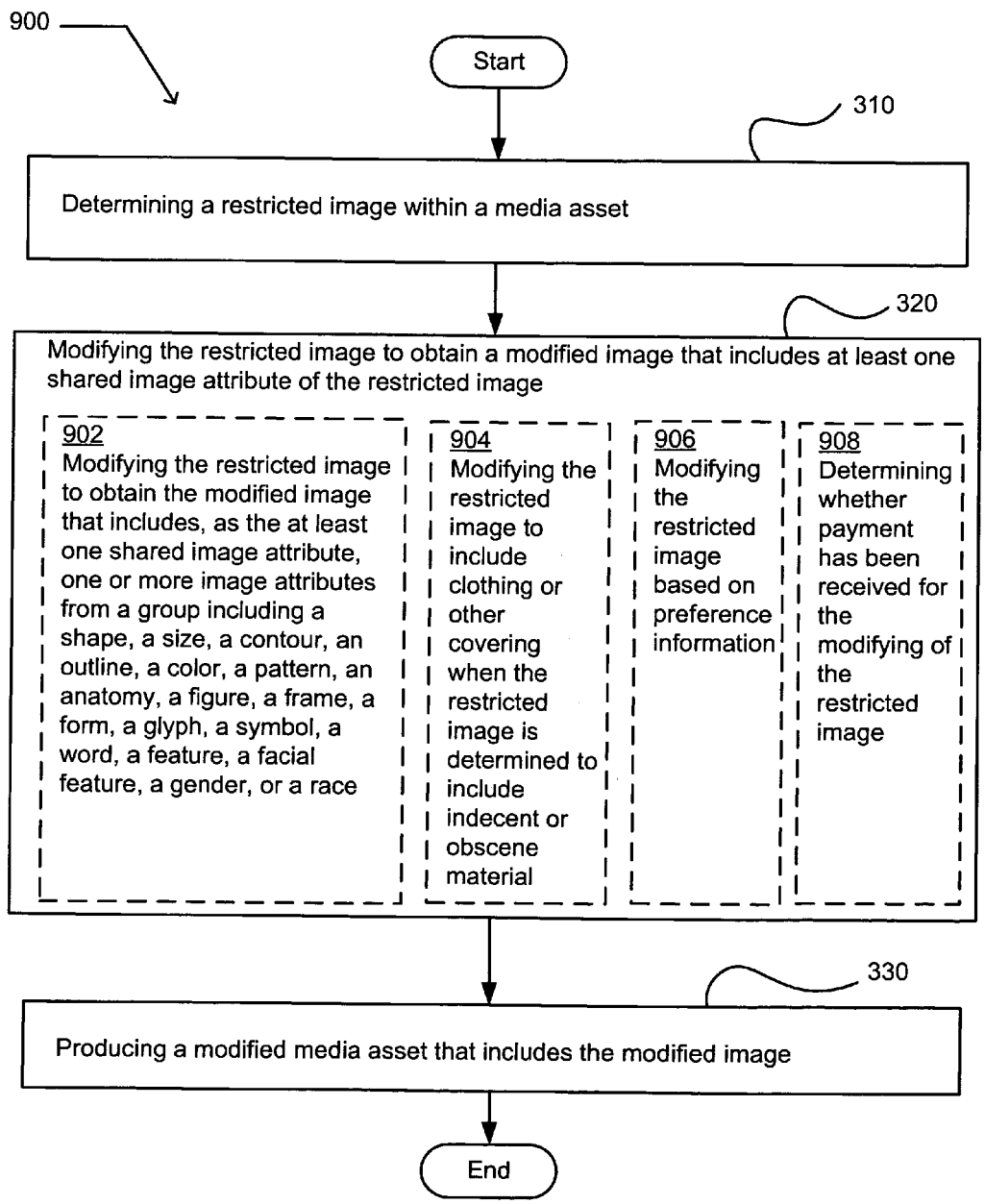
FIG. 9 illustrates an alternative embodiment of the example operational flow of FIG. 3.

FIG. 9 illustrates alternative embodiments of the example operational flow 300 of FIG. 3. FIG. 9 illustrates example embodiments where the modifying operation 320 may include at least one additional operation. Additional operations may include operation 902, operation 904, operation 906, and/or operation 908.

At the operation 902, the restricted image is modified to obtain the modified image that includes, as the at least one shared image attribute, one or more image attributes from a group including a shape, a size, a contour, an outline, a color, a pattern, an anatomy, a figure, a frame, a form, a glyph, a symbol, a word, a feature, a facial feature, a gender, or a race. For example, the recognition logic 112 may access the image restriction criteria 116 to determine one or more of these criteria, or other criteria, to determine the restricted image 108, as referenced above, and then the modification logic 114 may, perhaps in association with the replacement images 118, determine the modified image 110 in which at least one of the above attributes is shared between the modified image 110 and the restricted image 108.

At the operation 904, the restricted image is modified to include clothing or other covering when the restricted image is determined to include indecent or obscene material. For example, if the media asset 102 includes a website that includes a restricted image 108 that includes nudity, then the recognition logic may so recognize, and the modification logic 114 may add clothing or other covering to the restricted image 108. In this way, a general appearance of the website may be maintained.

At the operation 906, the restricted image may be modified based on preference information. For example, a number of types of preference information are described above, including preferences of the user who captured or created the media asset 102, or preferences of a human subject of the media asset 102, or preferences of a user who is in charge of producing, storing, transmitting, or delivering the media asset 102. Although such preference information was described above in terms of determining the restricted image 108, the operation 906 and examples provided herein also illustrate that such preferences, and other preferences, also may be used to determine a type or extent of modification that is performed by, for example, the modification logic 114.

At the operation 908, it is determined whether payment has been received for the modifying of the restricted image. For example, the user 122 may access the processing service 208 as part of a paid service in which the user 122 obtains modification of the media asset 102 in exchange for payment.

In this context, payment may refer generally to any type of monetary compensation, and/or non-monetary compensation, and/or economic value exchange. Such payment may, for example, occur between any pair of entities and/or other group of entities. By way of example and not limitation, a payment may include a non-monetary payment, such as a credit or coupon that may be exchanged for goods or services, a reduced or eliminated cost to a user or users for related or non-related goods or services. In another example, a payment may include granting a party certain rights or permissions as payment, such as information-related permissions. This may involve granting a party rights to certain information the party ordinarily would not have the right to access, or the right to use certain information in a particular manner. For example, one type of payment may include a party allowing another party to keep a user's personal information in a database for marketing or research purposes. In another example, as compensation or payment, a user or users may grant another party the right to monitor computer usage, or preferences or buying habits of the user in certain contexts, or the right to monitor a physical location or activity of the user. The user also may accept cash or cash-equivalents as payment from the provider for providing such entitlements, rights, or permissions. Thus, by providing and/or receiving monetary or non-monetary value, in an amount that may be designated as part of an agreement between the relevant parties, the parties may gain advantages and benefits that are mutually acceptable to both.

Figure 10:
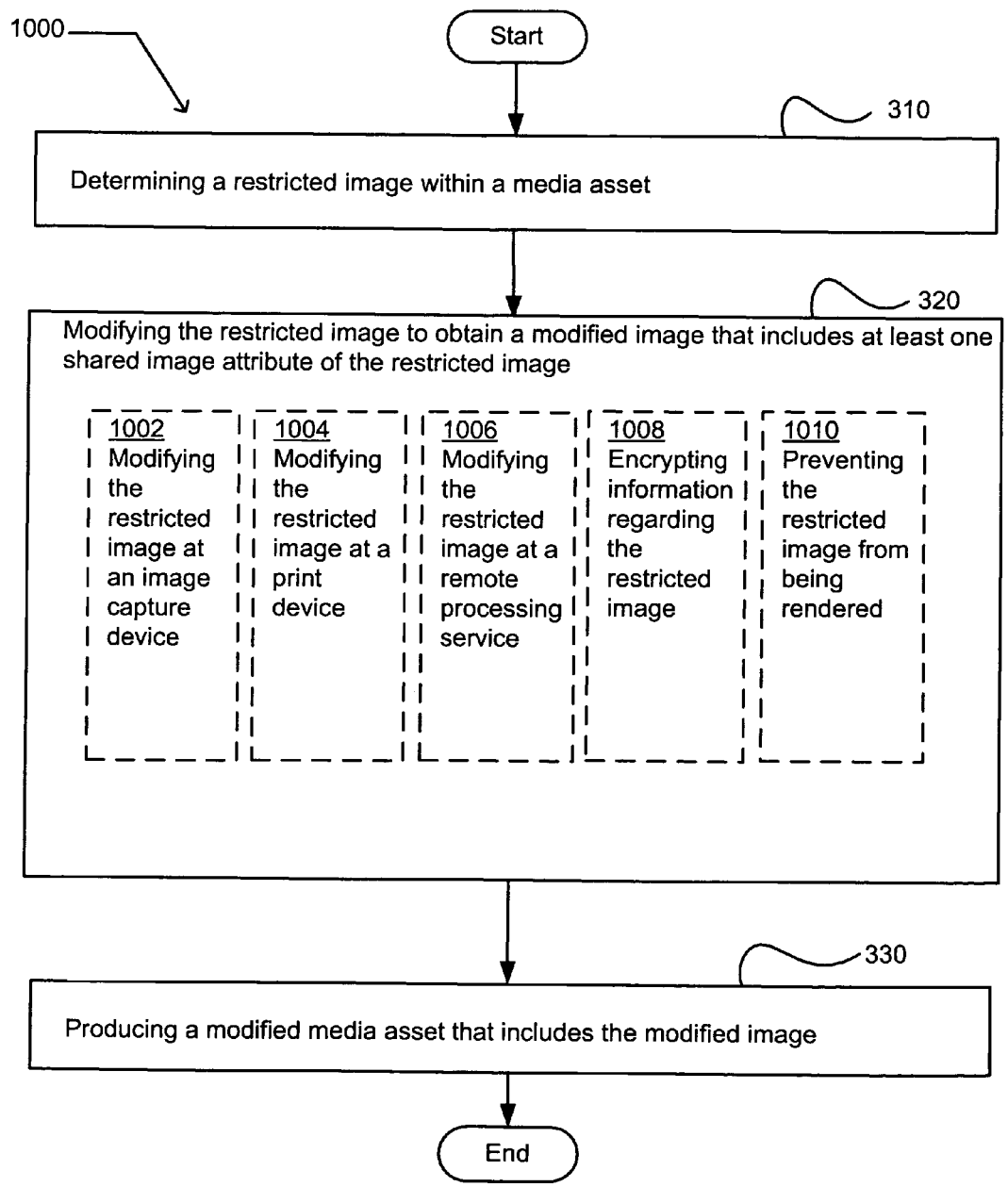
FIG. 10 illustrates an alternative embodiment of the example operational flow of FIG. 3.

FIG. 10 illustrates alternative embodiments of the example operational flow 300 of FIG. 3. FIG. 10 illustrates example embodiments where the modifying operation 320 may include at least one additional operation. Additional operations may include operation 1002, operation 1004, operation 1006, operation 1008, and/or operation 1010.

At the operation 1002, the restricted image is modified at an image capture device. For example, the restricted image 108 is modified at the processing system 104 within the camera 126b of FIG. 2B. Further, at the operation 1004, the restricted image is modified at a print device. For example, the restricted image 108 may be modified at the processing system 104 by the print device 126a of FIG. 2A. Further, at the operation 1006, the restricted image may be modified at a remote processing service. For example, the restricted image 108 may be modified at a processing system 104 of the processing service 208 of FIG. 2C.

At the operation 1008, information regarding the restricted image may be encrypted. For example, the modification logic 114 may be operable to encrypt the media asset 102 and/or the restricted image 108, prior to, or in conjunction with, producing the modified media asset 110. For example, the encrypted restricted image 108 may be aggregated with the modified media asset for output, or the encrypted restricted image 108 may be stored remotely from the modified media asset 110.

At the operation 1010, the restricted image is prevented from being rendered. For example, the modification logic 114 may corrupt information regarding the restricted image 108 such that the information is not, or can not be, stored for later access. In this way, for example, the anonymity of a person in the restricted image 108 may be maintained in full confidence.

Figure 11:
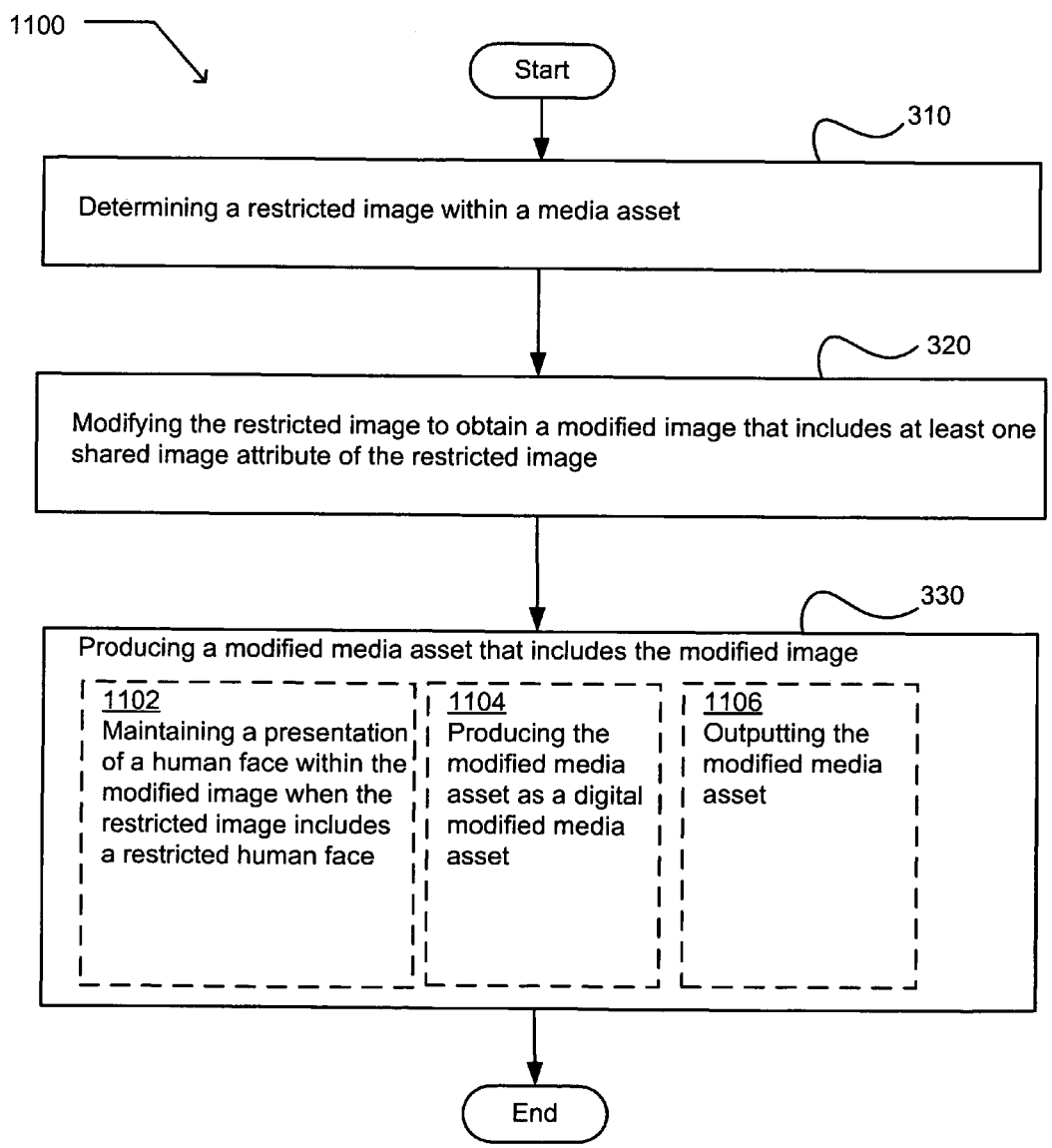
FIG. 11 illustrates an alternative embodiment of the example operational flow of FIG. 3.

FIG. 11 illustrates alternative embodiments of the example operational flow 300 of FIG. 3. FIG. 11 illustrates example embodiments where the producing operation 330 may include at least one additional operation. Additional operations may include operation 1102, operation 1104, and/or operation 1106.

At the operation 1102, a presentation of a human face is maintained within the modified image when the restricted image includes a restricted human face. For example, if the restricted image 108 includes a human face of a public figure or some other individual who has requested some level of anonymity, then that face may be replaced or otherwise modified, perhaps using the replacement images 118, by the modification logic 114.

At the operation 1104, the modified media asset is produced as a digital modified media asset. For example, the modification logic 114 may be operable to output the modified media asset 110 as a digital media asset.

At the operation 1106, the modified media asset is output. For example, the modified media asset 110 may be output to the user 122, who, as is apparent from the above discussion, may represent someone who has captured the media asset, someone who is reviewing the media asset, someone who is receiving the media asset, or anyone else who may have cause to receive the media asset.

Figure 12:
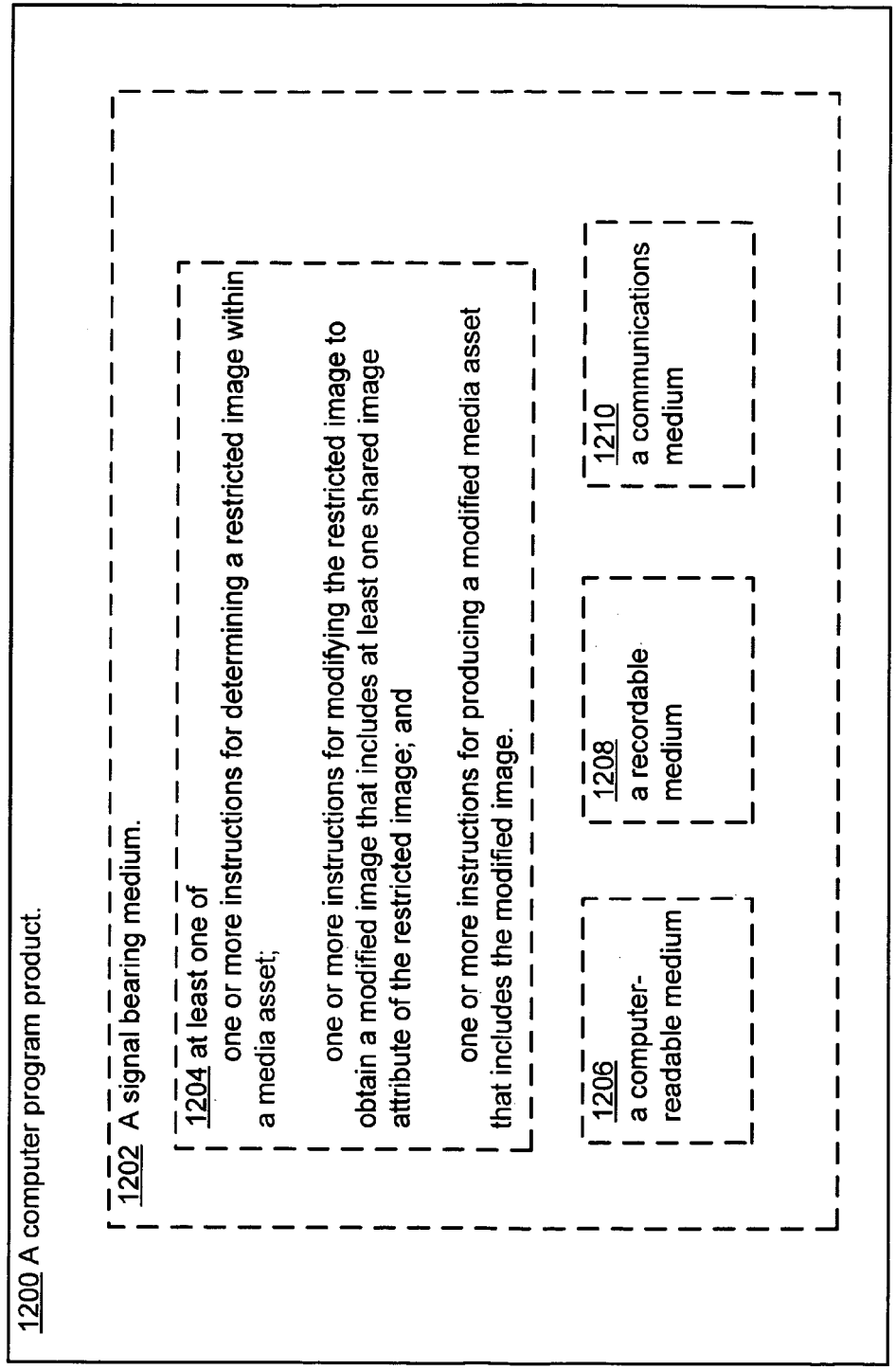
FIG. 12 illustrates a partial view of an example computer program product that includes a computer program for executing a computer process on a computing device.

FIG. 12 illustrates a partial view of an exemplary computer program product 1200 that includes a computer program 1204 for executing a computer process on a computing device. An embodiment of the exemplary computer program product 1200 is provided using a signal bearing medium 1202, and may include at least one of one or more instructions for determining a restricted image within a media asset, one or more instructions for modifying the restricted image to obtain a modified image that includes at least one shared image attribute of the restricted image, and one or more instructions for producing a modified media asset that includes the modified image. The one or more instructions may be, for example, computer executable and/or logic-implemented instructions. In one implementation, the signal-bearing medium 1202 may include a computer-readable medium 1206. In one implementation, the signal-bearing medium 1202 may include a recordable medium 1208. In one implementation, the signal-bearing medium 1202 may include a communications medium 1210.

Figure 13:
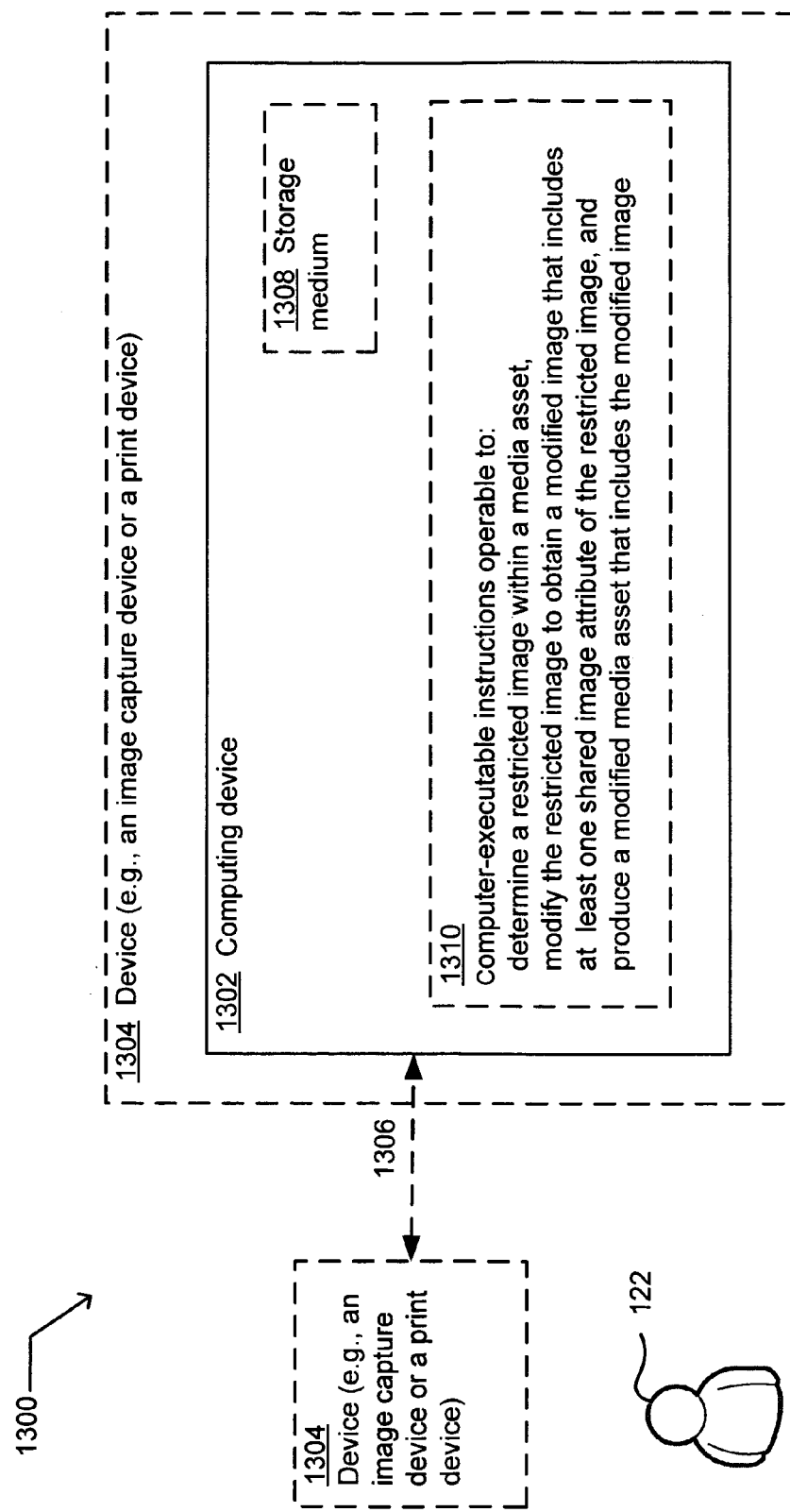
FIG. 13 illustrates an example device in which embodiments may be implemented.

FIG. 13 illustrates an exemplary system 1300 in which embodiments may be implemented. The system 1300 includes a computing system environment. The system 1300 also illustrates the user 122 using a user device 1304, which is optionally shown as being in communication with a computing device 1302 by way of an optional coupling 1306. The optional coupling 1306 may represent a local, wide-area, or peer-to-peer network, or may represent a bus that is internal to a computing device (e.g., in example embodiments in which the computing device is contained in whole or in part within the user device 1304). A storage medium 1308 may be any computer storage media.

The computing device 1302 includes an operability to receive the media asset 102. The computing device 1302 also includes computer executable instructions 1310 that when executed on the computing device 1302 causes the computing device 1302 to determine a restricted image within a media asset, modify the restricted image to obtain a modified image that includes at least one shared image attribute of the restricted image, and produce a modified media asset that includes the modified image.

As referenced above and as shown in FIG. 13, in some examples, the computing device 1302 may optionally be contained in whole or in part within the user device 1304, and may include the image-capture device (camera) 126b or the printer 126a. For example, the user device 1304 may include a cell phone, and the computing device 1302 may be included as part of a digital camera included within the cell phone. In another example embodiment, the computing device 1302 is operable to communicate with the user device 1304 associated with the user 122 to receive the media asset 102 from the user 122 and to provide the modified media asset 106 to the user 122.

Figure 14:
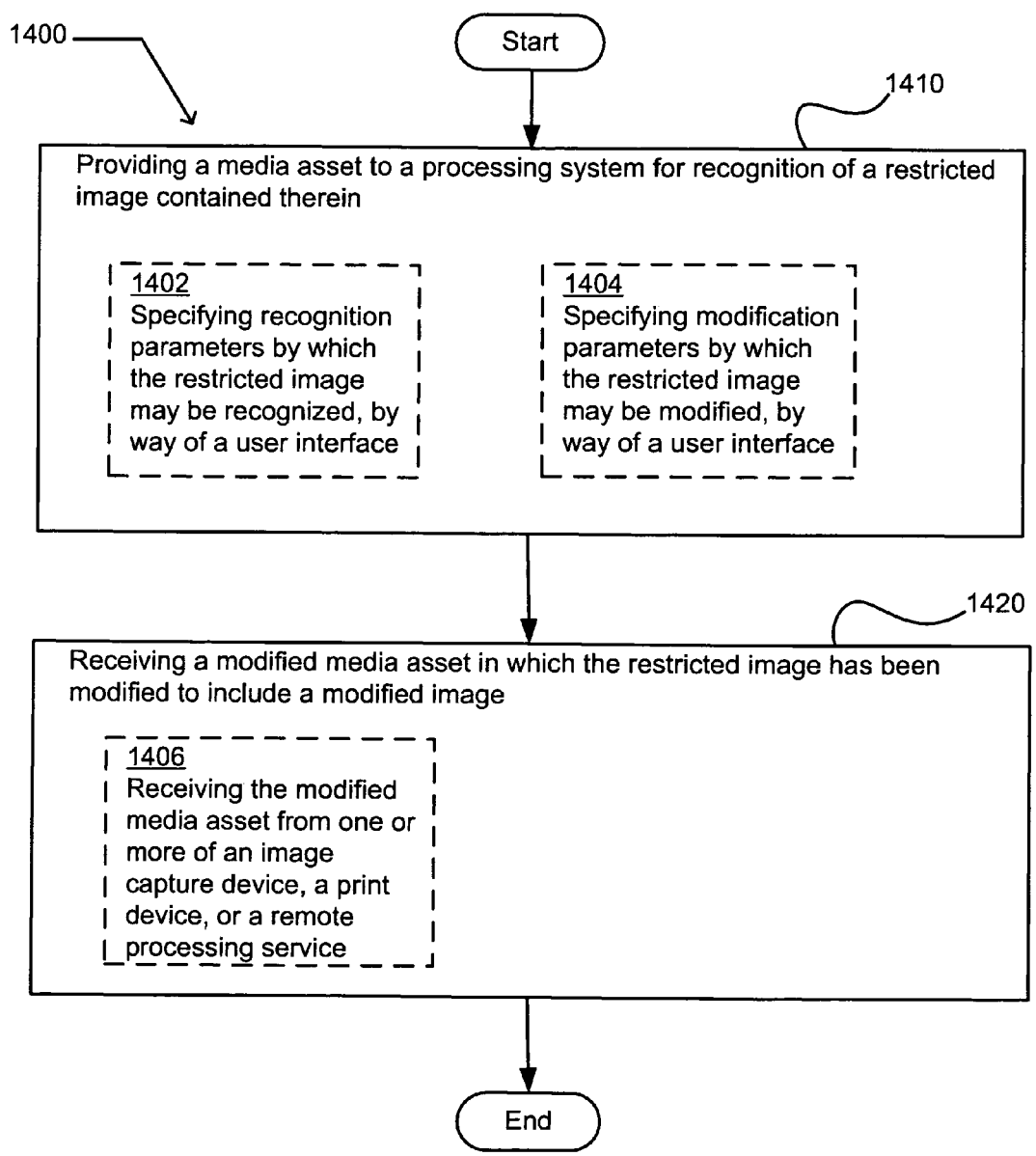
FIG. 14 illustrates an operational flow representing example operations by which a user receives a modified media asset that includes a modified image.

FIG. 14 illustrates an operational flow 1400 representing example operations by which the user 122 obtains the modified media asset 106 that includes the modified image 110. At operation 1410, a user provides a media asset to a processing system for recognition of a restricted image contained therein. For example, the user 122 may provide the media asset 102 to the processing system 104 for recognition of the restricted image 108 by the recognition logic 112. At operation 1420, a modified media asset is received in which the restricted image has been modified to include a modified image. For example, the modified media asset 106 may be received in which the restricted image 108 has been modified to include the modified image 110.

The operation 1410 may include one or more additional operations. For example, the operation 1410 may include an operation 1402 in which recognition parameters by which the restricted image may be recognized are specified by way of a user interface. For example, the user 122 may set parameters of the recognition logic 112.

Also, the operation 1410 may include an operation 1404, in which modification parameters by which the restricted image may be modified are specified by way of a user interface. For example, the user 122 may specify parameters of the modification logic 114, by way of the user interface 124.

The operation 1420 may include one or more operations. For example, the operation 1420 may include an operation 1406, in which the modified media asset is received from one or more of an image capture device, a print device, or a remote processing service. For example, the user 122 may receive the modified media asset 106 by way of the print device 126a, the camera 126b, or the remote processing system 208.

Of course, the user 122 may receive the modified media asset 106 in other ways: For example, the modified media asset 106 may be received as stored on a memory device. For example, the user may capture an audio and/or visual file using an image capture device or by way of downloading from a website or other location. The user may store the resulting digital file on a memory card, memory stick, CD, DVD, or other storage media.

Figure 15:
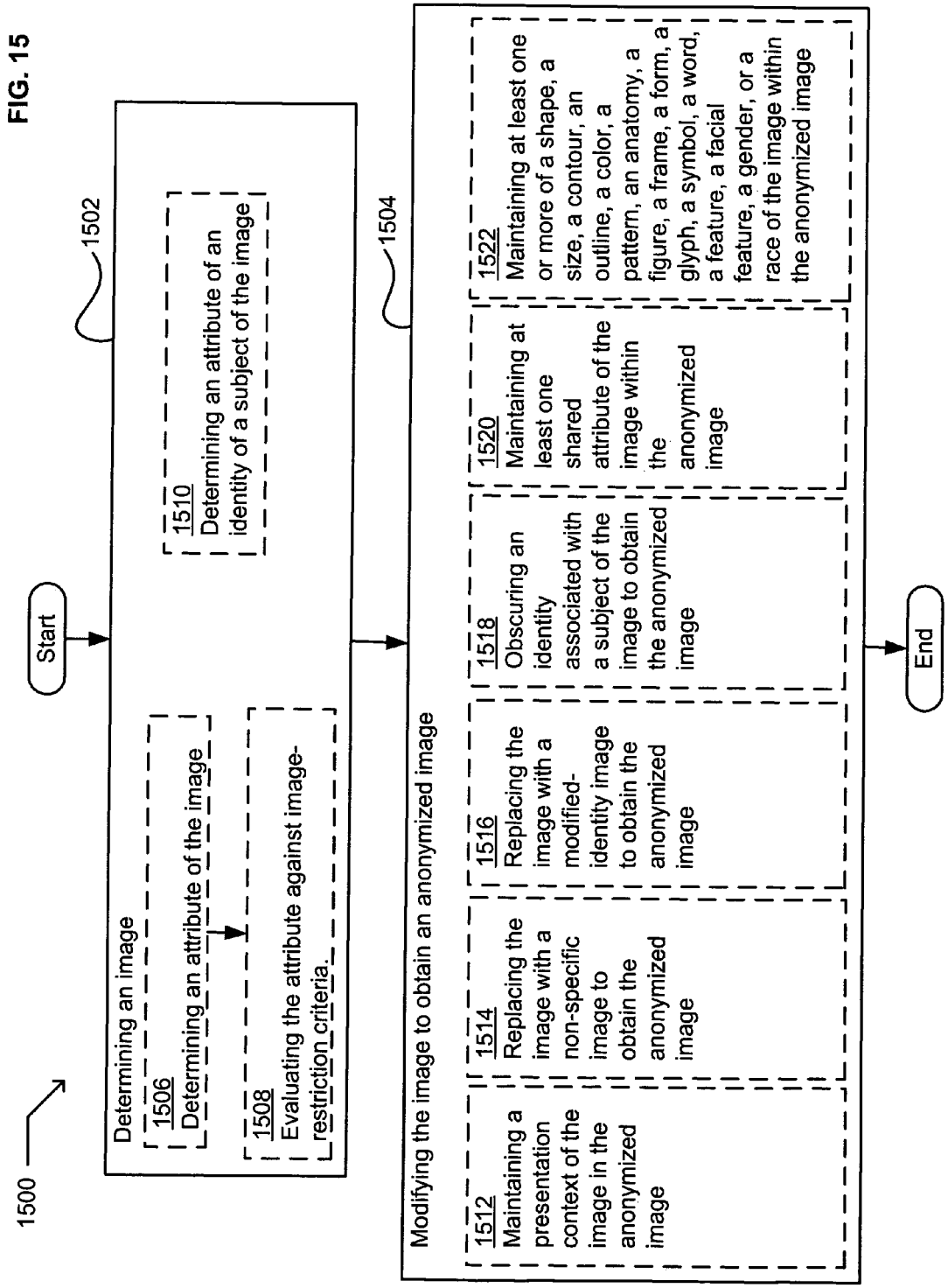
FIG. 15 illustrates an operational flow representing example operations that produce an anonymized image.

FIG. 15 illustrates an operational flow 1500 representing example operations that produce the modified media asset 106. After a start operation, the operational flow 1500 moves to a determining operation 1502 where an image is determined. For example, the image 108 may be determined to exist within the media asset 102. At the operation 1504, the image is modified to obtain an anonymized image. For example, as described in various contexts above, one image may be altered or changed such that a subject of the image is protected from inclusion therein, yet without alerting a user in a normal or anticipated use of the image from noticing the protection.

The operational flow 1500 may include additional operations. For example, the operational flow 1500 may include operations 1506, 1508, 1510, 1512, 1514, 1516, 1518, 1520, and 1522.

At the operations 1506 and 1508, respectively, and as an alternative embodiment of the determining operation 1502, an attribute of the image is determined, and the attribute is evaluated against image-restriction criteria. For example, the recognition logic 112 may determine an attribute(s) of the media asset 102, or of the image 108 itself, including any of the numerous attributes discussed herein, or others not specifically discussed. Then, the recognition logic 112 may evaluate the attribute against the image restriction criteria 116.

At the operation 1510, an attribute of an identity of a subject of the image is determined. For example, a subject of the image 108 may be a public figure, or someone else who has specified (or about whom it has been specified) that any or certain images of him or herself should be anonymized. The recognition logic 112 may thus determine an attribute of an identity of this person, including those mentioned herein such as name, occupation, physical trait, or others.

The modifying operation 1504 may include alternative embodiments, as well. For example, at the operation 1512, a presentation context of the image in the anonymized image is preserved. For example, the modified image 110 may be presented with a same or similar clarity, resolution, contrast, color, or balance as the image 108 (as opposed to, e.g., simply blocking out or blurring the image 108), and/or the concurrent image(s) 120 may be maintained.

At the operation 1514, the image may be replaced with a non-specific image to obtain the anonymized image. For example, a non-specific image, e.g., an image that is not specific to the media asset 102, and/or to a subject of the image 108, may be selected from the replacement images 118.

At the operation 1516, the image may be replaced with a modified-identity image to obtain the anonymized image. For example, the modified image 110 may be associated with a subject having an identity different from that of an identity of the image 108.

At the operation 1518, an identity associated with a subject of the image may be obscured to obtain the anonymized image. For example, an identity of the subject of the image 108 may be obscured, as opposed to the image 108 itself being obscured in the sense of being blocked out, covered, or blurred.

At the operation 1520, at least one shared attribute of the image may be maintained within the anonymized image. Also, at the operation 1522, at least one or more of a shape, a size, a contour, an outline, a color, a pattern, an anatomy, a figure, a frame, a form, a glyph, a symbol, a word, a feature, a facial feature, a gender, or a race of the image may be maintained within the anonymized image. For example, any of the above attributes, or combinations thereof, or other attributes, may be maintained within the anonymized image 110 with respect to the image 108.

Figure 16:
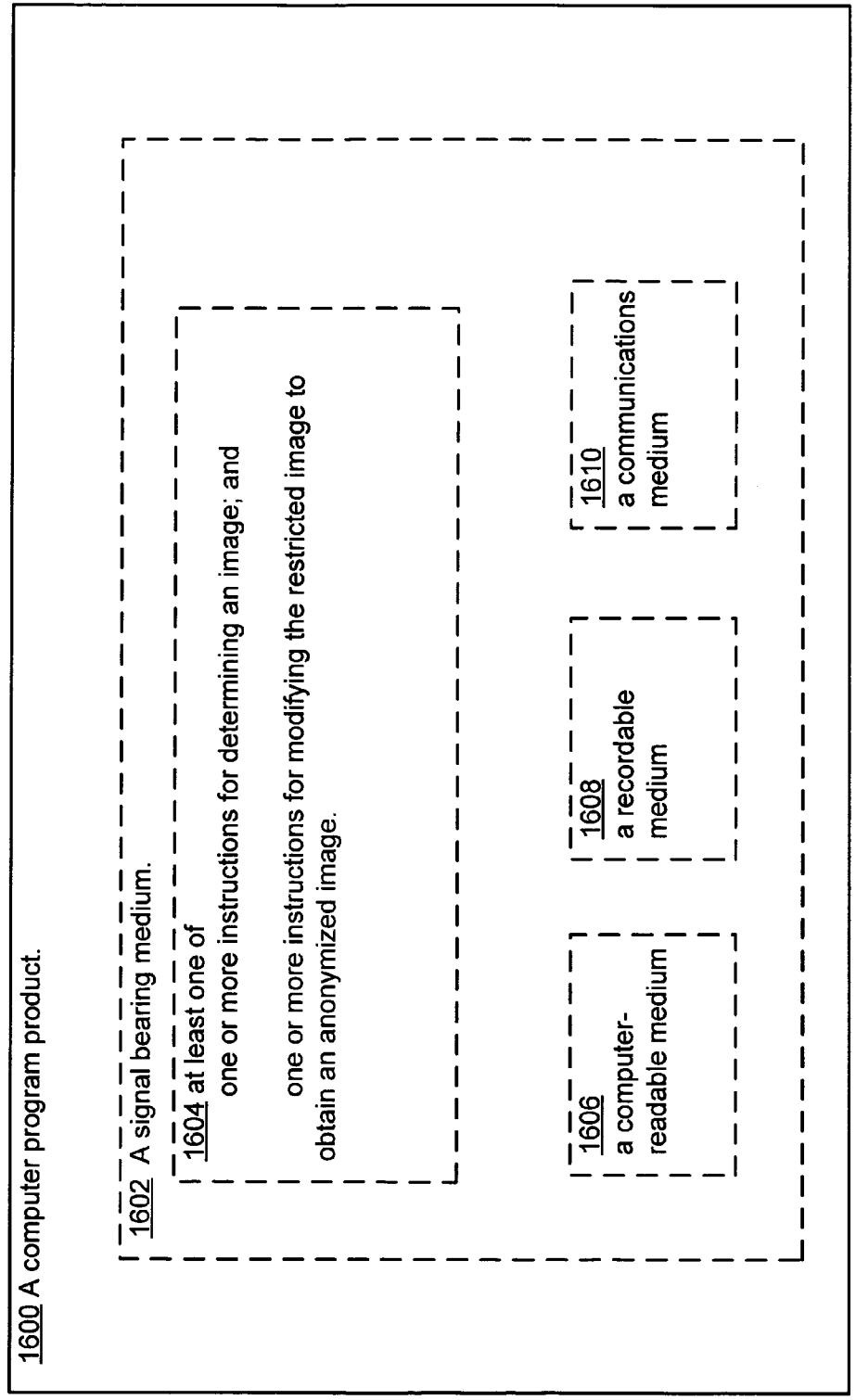
FIG. 16 illustrates a partial view of an example computer program product that includes a computer program for executing a computer process on a computing device.

FIG. 16 illustrates a partial view of an exemplary computer program product 1600 that includes a computer program 1604 for executing a computer process on a computing device. An embodiment of the exemplary computer program product 1600 is provided using a signal bearing medium 1602, and may include at least one of one or more instructions for determining an image, and one or more instructions for modifying the image to obtain an anonymized image. The one or more instructions may be, for example, computer executable and/or logic-implemented instructions. In one implementation, the signal-bearing medium 1602 may include a computer-readable medium 1606. In one implementation, the signal-bearing medium 1602 may include a recordable medium 1608. In one implementation, the signal-bearing medium 1602 may include a communications medium 1610.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together; etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interactable and/or logically interacting components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    determining identity information of a subject included within a restricted image within a media asset;
    modifying the restricted image to obtain a modified image, including at least replacing the subject with another subject; and
    producing a modified media asset that includes the modified image.

2. The method of claim 1 wherein determining identity information of a subject included within a restricted image within a media asset comprises:
    determining identity information associated with the restricted image, including at least receiving an attribute describing a person.

3. The method of claim 1 wherein determining identity information of a subject included within a restricted image within a media asset comprises:
    associating at least a portion of the media asset with a user capture device used to capture the media asset.

4. The method of claim 1 wherein determining identity information of a subject included within a restricted image within a media asset comprises:
    associating at least a portion of the media asset with a user known to have captured the media asset.

5. The method of claim 1 wherein determining identity information of a subject included within a restricted image within a media asset comprises:
    associating at least a portion of the media asset with a setting content of the restricted image.

6. The method of claim 1 wherein determining identity information of a subject included within a restricted image within a media asset comprises:
    determining an attribute of a concurrently-imaged object within the media asset.

7. The method of claim 1 wherein determining identity information of a subject included within a restricted image within a media asset comprises:
    performing image recognition analysis on a portion of the media asset.

8. The method of claim 1 wherein determining identity information of a subject included within a restricted image within a media asset and modifying the restricted image to obtain a modified image, including at least replacing the subject with another subject comprise:
    determining identity information of a human subject included within a restricted image; and
    modifying the restricted image to obtain a modified image, including at least replacing the image of the human subject with another human subject, the modified image having a shared image attribute including a shared shape.

9. The method of claim 1 wherein determining identity information of a subject included within a restricted image within a media asset comprises:
    performing facial recognition analysis on a portion of the media asset.

10. The method of claim 1 wherein determining identity information of a subject included within a restricted image within a media asset comprises:
    analyzing metadata associated with the restricted image.

11. The method of claim 10 wherein analyzing metadata associated with the restricted image comprises:

analyzing a closed-captioning stream that is associated with the media asset.

12. The method of claim 1 wherein determining identity information of a subject included within a restricted image within a media asset comprises:
evaluating an attribute of the restricted image against image-restriction criteria.

13. The method of claim 1 wherein determining identity information of a subject included within a restricted image within a media asset comprises:
determining a preference of a user who captured the media asset.

14. The method of claim 1 wherein determining identity information of a subject included within a restricted image within a media asset comprises:
determining a preference of a producer of the restricted image.

15. The method of claim 1 wherein determining identity information of a subject included within a restricted image within a media asset comprises:
determining a restricted image within at least one of a still picture or a video stream.

16. The method of claim 1 wherein modifying the restricted image to obtain a modified image, including at least replacing the subject with another subject comprises:
replacing the restricted image with a modified image selected from a database of replacement images that are known to include at least one shared image attribute with the restricted image.

17. The method of claim 1 wherein modifying the restricted image to obtain a modified image, including at least replacing the subject with another subject comprises:
modifying the restricted image via replacing the restricted image with a modified image selected from a database of replacement images that are known to include at least one shared image attribute with the restricted image, the modifying the restricted image occurring without modifying the at least one shared image attribute.

18. The method of claim 1 wherein modifying the restricted image to obtain a modified image, including at least replacing the subject with another subject comprises:
maintaining a presentation context of the media asset within the modified media asset.

19. The method of claim 1 wherein modifying the restricted image to obtain a modified image, including at least replacing the subject with another subject comprises:
determining that the modified image is associated with modified identity information that is different from identity information associated with the restricted image.

20. The method of claim 1 wherein modifying the restricted image to obtain a modified image, including at least replacing the subject with another subject comprises:
obscuring an identity of a human subject of the restricted image by replacing the human subject with a replacement human subject having a different identity.

21. The method of claim 1 wherein modifying the restricted image to obtain a modified image, including at least replacing the subject with another subject comprises:
modifying the restricted image via replacing the restricted image with a modified image selected from a database of replacement images that are known to include at least one shared image attribute with the restricted image to obtain the modified image that includes, as the at least one shared image attribute, one or more image attributes from a group including a shape, a size, a contour, an outline, a color, a pattern, an anatomy, a figure, a frame, a form, a glyph, a symbol, a word, a feature, a facial feature, a gender, or a race.

22. The method of claim 1 wherein modifying the restricted image to obtain a modified image, including at least replacing the subject with another subject comprises:
modifying the restricted image to include clothing or other covering when the restricted image is determined to include indecent or obscene material.

23. The method of claim 1 wherein modifying the restricted image to obtain a modified image, including at least replacing the subject with another subject comprises:
modifying the restricted image based on preference information.

24. The method of claim 1 wherein modifying the restricted image to obtain a modified image, including at least replacing the subject with another subject comprises:
determining that payment has been received for the modifying of the restricted image.

25. The method of claim 1 wherein modifying the restricted image to obtain a modified image, including at least replacing the subject with another subject comprises:
modifying the restricted image at an image capture device.

26. The method of claim 1 wherein modifying the restricted image to obtain a modified image, including at least replacing the subject with another subject comprises:
modifying the restricted image at a print device.

27. The method of claim 1 wherein modifying the restricted image to obtain a modified image, including at least replacing the subject with another subject comprises:
modifying the restricted image at a remote processing service.

28. The method of claim 1 wherein modifying the restricted image to obtain a modified image, including at least replacing the subject with another subject comprises:
encrypting information regarding the restricted image.

29. The method of claim 1 wherein modifying the restricted image to obtain a modified image, including at least replacing the subject with another subject comprises:
preventing the restricted image from being rendered.

30. The method of claim 1 wherein modifying the restricted image to obtain a modified image, including at least replacing the subject with another subject comprises:
maintaining a presentation of a human face within the modified image when the restricted image includes a restricted human face.

31. The method of claim 1 wherein modifying the restricted image to obtain a modified image, including at least replacing the subject with another subject comprises:
producing the modified media asset as a digital modified media asset.

32. The method of claim 1 wherein modifying the restricted image to obtain a modified image, including at least replacing the subject with another subject comprises:
outputting the modified media asset.

33. A computer program product comprising:
at least one non-transitory computer readable medium including at least:
one or more instructions for determining identity information of a subject included within a restricted image within a media asset,
one or more instructions for modifying the restricted image to obtain a modified image, including at least one or more instructions for replacing the subject with another subject, and
one or more instructions for producing a modified media asset that includes the modified image.

34. A system, comprising:
   circuitry for determining identity information of a subject included within a restricted image within a media asset; and
   circuitry for modifying the restricted image to obtain a modified image, including at least circuitry for replacing the subject with another subject.

* * * * *